(12) United States Patent
Wintemute et al.

(10) Patent No.: US 9,772,124 B2
(45) Date of Patent: Sep. 26, 2017

(54) HEAT PUMP DEFROSTING SYSTEM AND METHOD

(71) Applicant: Nortek Air Solutions Canada, Inc., Saskatoon (CA)

(72) Inventors: David Martin Wintemute, Trois-Rivieres (CA); Mathieu Philippe Beliveau, Victoriaville (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 278 days.

(21) Appl. No.: 14/186,420

(22) Filed: Feb. 21, 2014

(65) Prior Publication Data

US 2014/0260368 A1    Sep. 18, 2014

Related U.S. Application Data

(60) Provisional application No. 61/778,681, filed on Mar. 13, 2013.

(51) Int. Cl.
*F25B 41/00*    (2006.01)
*F25B 6/04*    (2006.01)
(Continued)

(52) U.S. Cl.
CPC ............... *F25B 6/04* (2013.01); *F25B 13/00* (2013.01); *F25B 47/025* (2013.01); *F25B 49/022* (2013.01); *F24F 2011/0087* (2013.01); *F25B 2313/0251* (2013.01); *F25B 2400/0403* (2013.01); *F25B 2600/0271* (2013.01);
(Continued)

(58) Field of Classification Search
CPC ...... F25B 2313/025; F25B 6/04; F25B 30/02; F25B 49/022; F25B 2313/0251; F25B 2600/0272; F25B 2700/2109; F25B 2400/0403; F25B 2600/0271;
(Continued)

(56) References Cited

U.S. PATENT DOCUMENTS 2,186,844 A    1/1940    Smith
2,562,811 A    7/1951    Glenn
(Continued)

FOREIGN PATENT DOCUMENTS

CA         2843987 A1    9/2014
CN       101701739 A    5/2010
(Continued)

OTHER PUBLICATIONS

"AAONAIRE® Energy Recovery Units Users Information Manual", R86610 (Rev. A 8-06), (Aug. 2006), 16 pgs.
(Continued)

*Primary Examiner* — Len Tran
*Assistant Examiner* — Ana Vazquez
(74) *Attorney, Agent, or Firm* — Schwegman Lundberg & Woessner, P.A.

(57) ABSTRACT

A heat pump system for conditioning regeneration air from a space is provided. The heat pump system is operable in a winter mode and/or a summer mode, and may be selectively operated in a defrost mode or cycle. During a defrost mode, hot refrigerant may be used to directly and sequentially defrost the regeneration air heat exchanger. A compressor may be configured to be overdriven during a defrost cycle.

17 Claims, 15 Drawing Sheets

(51) Int. Cl.
*F25B 13/00* (2006.01)
*F25B 47/02* (2006.01)
*F25B 49/02* (2006.01)
*F24F 11/00* (2006.01)

(52) U.S. Cl.
CPC ............. *F25B 2600/0272* (2013.01); *F25B 2700/1931* (2013.01); *F25B 2700/1933* (2013.01); *F25B 2700/21151* (2013.01); *F25B 2700/21152* (2013.01)

(58) Field of Classification Search
CPC .. F25B 2700/21152; F25B 2700/21151; F25B 2700/1931; F24F 2011/0087; F25D 17/06
USPC .......................................................... 62/271
See application file for complete search history.

(56) References Cited

U.S. PATENT DOCUMENTS

| | | |
|---|---|---|
| 2,946,201 A | 7/1960 | Munters |
| 2,968,165 A | 1/1961 | Gunnar |
| 3,009,684 A | 11/1961 | Georg |
| 3,247,679 A | 4/1966 | Gershon |
| 3,401,530 A | 9/1968 | Gershon |
| 3,918,268 A * | 11/1975 | Nussbaum ............ F25B 47/006 62/150 |
| 4,113,004 A | 9/1978 | Rush et al. |
| 4,157,649 A | 6/1979 | Bussjager |
| 4,180,985 A | 1/1980 | Northrup, Jr. |
| 4,235,081 A | 11/1980 | Dowling |
| 4,356,703 A | 11/1982 | Vogel |
| 4,474,021 A | 10/1984 | Harband |
| 4,594,860 A | 6/1986 | Coellner et al. |
| 4,719,761 A | 1/1988 | Cromer |
| 4,729,774 A | 3/1988 | Cohen et al. |
| 4,887,438 A | 12/1989 | Meckler |
| 4,903,503 A | 2/1990 | Meckler |
| 4,936,107 A | 6/1990 | Kitagaki et al. |
| 4,982,575 A | 1/1991 | Besik |
| 5,003,961 A | 4/1991 | Besik |
| 5,148,374 A | 9/1992 | Coellner |
| 5,170,633 A | 12/1992 | Kaplan |
| 5,176,005 A | 1/1993 | Kaplan |
| 5,325,676 A | 7/1994 | Meckler |
| 5,337,574 A | 8/1994 | Dick |
| 5,351,497 A | 10/1994 | Lowenstein |
| 5,353,606 A | 10/1994 | Yoho et al. |
| 5,373,704 A | 12/1994 | Mcfadden |
| 5,448,895 A | 9/1995 | Coellner et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,533,568 A | 7/1996 | Schuster |
| 5,538,072 A | 7/1996 | Burkhart |
| 5,542,968 A | 8/1996 | Belding et al. |
| 5,551,245 A | 9/1996 | Calton et al. |
| 5,564,281 A * | 10/1996 | Calton ................... F24F 3/1411 62/271 |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,660,048 A | 8/1997 | Belding et al. |
| 5,685,897 A | 11/1997 | Belding et al. |
| 5,701,762 A | 12/1997 | Akamatsu et al. |
| 5,727,394 A | 3/1998 | Belding et al. |
| 5,749,230 A | 5/1998 | Coellner et al. |
| 5,758,508 A | 6/1998 | Belding et al. |
| 5,761,915 A | 6/1998 | Rao |
| 5,761,923 A | 6/1998 | Maeda |
| 5,791,153 A | 8/1998 | Belding et al. |
| 5,816,065 A | 10/1998 | Maeda |
| 5,825,641 A | 10/1998 | Mangtani |
| 5,826,434 A | 10/1998 | Belding et al. |
| 5,860,284 A | 1/1999 | Goland et al. |
| 5,890,368 A * | 4/1999 | Lakdawala ............ F24F 3/1405 62/151 |
| 5,890,372 A | 4/1999 | Belding et al. |
| 5,931,016 A | 8/1999 | Yoho |
| 5,943,874 A | 8/1999 | Maeda |
| 5,992,160 A | 11/1999 | Bussjager et al. |
| 6,003,327 A | 12/1999 | Belding et al. |
| 6,018,953 A | 2/2000 | Belding et al. |
| 6,029,462 A | 2/2000 | Denniston |
| 6,029,467 A | 2/2000 | Moratalla |
| 6,050,100 A | 4/2000 | Belding et al. |
| 6,079,481 A | 6/2000 | Lowenstein et al. |
| 6,094,835 A | 8/2000 | Cromer |
| 6,141,979 A | 11/2000 | Dunlap |
| 6,176,101 B1 | 1/2001 | Lowenstein |
| 6,178,762 B1 | 1/2001 | Flax |
| 6,199,388 B1 | 3/2001 | Fischer |
| 6,199,392 B1 | 3/2001 | Maeda |
| 6,209,622 B1 * | 4/2001 | Lagace ................ F24F 3/1423 165/54 |
| 6,233,951 B1 | 5/2001 | Cardill |
| 6,237,354 B1 | 5/2001 | Cromer |
| 6,247,323 B1 | 6/2001 | Maeda |
| 6,269,650 B1 | 8/2001 | Shaw |
| 6,276,158 B1 | 8/2001 | Lowes |
| 6,318,106 B1 | 11/2001 | Maeda |
| RE37,464 E | 12/2001 | Meckler |
| 6,363,218 B1 | 3/2002 | Lowenstein et al. |
| 6,442,951 B1 | 9/2002 | Maeda et al. |
| 6,568,466 B2 | 5/2003 | Lowenstein et al. |
| 6,575,228 B1 | 6/2003 | Ragland et al. |
| 6,644,059 B2 | 11/2003 | Maeda et al. |
| 6,720,990 B1 | 4/2004 | Walker et al. |
| 6,745,826 B2 | 6/2004 | Lowenstein et al. |
| 6,751,964 B2 | 6/2004 | Fischer |
| 6,848,265 B2 | 2/2005 | Lowenstein et al. |
| 6,918,263 B2 | 7/2005 | Lee et al. |
| 6,973,795 B1 | 12/2005 | Moffitt |
| 7,013,655 B2 | 3/2006 | Des Champs |
| 7,017,356 B2 | 3/2006 | Moffitt |
| 7,089,754 B2 | 8/2006 | Chin |
| 7,092,006 B2 | 8/2006 | Walker et al. |
| 7,171,817 B2 | 2/2007 | Birgen |
| 7,178,355 B2 | 2/2007 | Moffitt |
| 7,213,407 B2 | 5/2007 | Hu |
| 7,231,967 B2 | 6/2007 | Haglid |
| 7,269,966 B2 | 9/2007 | Lowenstein et al. |
| 7,306,650 B2 | 12/2007 | Slayzak et al. |
| 7,340,906 B2 | 3/2008 | Moffitt |
| 7,389,646 B2 | 6/2008 | Moffitt |
| 7,461,515 B2 | 12/2008 | Wellman |
| 7,593,033 B2 | 9/2009 | Walker et al. |
| 7,602,414 B2 | 10/2009 | Walker et al. |
| 7,605,840 B2 | 10/2009 | Walker et al. |
| 7,614,249 B2 | 11/2009 | Hu |
| 7,719,565 B2 | 5/2010 | Walker et al. |
| 7,817,182 B2 | 10/2010 | Walker et al. |
| 7,883,024 B2 | 2/2011 | Nakayama |
| 7,966,841 B2 | 6/2011 | Lowenstein et al. |
| 8,091,372 B1 | 1/2012 | Ekern |
| 8,915,092 B2 | 12/2014 | Gerber et al. |
| 2002/0129614 A1 | 9/2002 | Dinnage et al. |
| 2004/0000399 A1 | 1/2004 | Gavula |
| 2004/0123616 A1 * | 7/2004 | Lee ........................ F24F 3/1423 62/271 |
| 2004/0134211 A1 | 7/2004 | Lee et al. |
| 2005/0257557 A1 | 11/2005 | Chin |
| 2005/0262862 A1 | 12/2005 | Moffitt |
| 2005/0279117 A1 | 12/2005 | Choi |
| 2006/0144060 A1 | 7/2006 | Birgen |
| 2006/0225451 A1 | 10/2006 | Hu |
| 2007/0095519 A1 | 5/2007 | Hombucher |
| 2007/0137238 A1 | 6/2007 | Hu |
| 2008/0078198 A1 * | 4/2008 | Breiding ................ F28B 9/08 62/324.5 |

(56) References Cited

U.S. PATENT DOCUMENTS

| | | | |
|---|---|---|---|
| 2010/0170655 A1 | 7/2010 | Kronvall et al. | |
| 2010/0218528 A1* | 9/2010 | Yakumaru | F25B 47/022 62/234 |
| 2010/0229575 A1 | 9/2010 | Shaw | |
| 2010/0242507 A1 | 9/2010 | Meckler | |
| 2010/0251742 A1 | 10/2010 | Tucker | |
| 2010/0307175 A1 | 12/2010 | Teige et al. | |
| 2010/0319370 A1 | 12/2010 | Kozubal et al. | |
| 2011/0289952 A1 | 12/2011 | Kim | |
| 2011/0289956 A1 | 12/2011 | Shah | |
| 2011/0308265 A1 | 12/2011 | Phannavong et al. | |
| 2012/0047923 A1 | 3/2012 | Wintemute | |
| 2012/0055460 A1* | 3/2012 | Lambertson | F24F 7/06 126/299 D |
| 2012/0085112 A1 | 4/2012 | Wintemute | |
| 2012/0111042 A1 | 5/2012 | Hamada | |
| 2012/0125020 A1 | 5/2012 | Vandermeulen et al. | |
| 2012/0125021 A1 | 5/2012 | Vandermeulen et al. | |
| 2012/0125029 A1 | 5/2012 | Moreau | |
| 2012/0125031 A1 | 5/2012 | Vandermeulen et al. | |
| 2012/0125405 A1 | 5/2012 | Vandermeulen et al. | |
| 2012/0125581 A1 | 5/2012 | Allen et al. | |
| 2012/0131934 A1 | 5/2012 | Vandermeulen et al. | |
| 2012/0131937 A1 | 5/2012 | Vandermeulen et al. | |
| 2012/0131938 A1 | 5/2012 | Vandermeulen et al. | |
| 2012/0131939 A1 | 5/2012 | Vandermeulen et al. | |
| 2012/0131940 A1 | 5/2012 | Vandermeulen et al. | |
| 2012/0132513 A1 | 5/2012 | Vandermeulen et al. | |
| 2012/0180505 A1 | 7/2012 | Gerber et al. | |
| 2012/0186281 A1 | 7/2012 | Vandermeulen et al. | |

FOREIGN PATENT DOCUMENTS

| | | |
|---|---|---|
| CN | 101900378 A | 12/2010 |
| CN | 105202795 A | 12/2015 |
| EP | 2397787 A2 | 12/2011 |
| GB | 2015384 A | 9/1979 |
| JP | 05-157282 A | 6/1993 |
| JP | 07310964 A | 11/1995 |
| JP | 09-196482 A | 7/1997 |
| JP | 2004-257588 A | 9/2004 |
| JP | 2006308241 A | 11/2006 |
| JP | 2006336999 A | 12/2006 |
| JP | 2008304150 A | 12/2008 |
| WO | WO-96/41107 A1 | 12/1996 |
| WO | WO-99/14535 A1 | 3/1999 |
| WO | WO-01/71260 A1 | 9/2001 |
| WO | WO-2009/000974 A1 | 12/2008 |
| WO | WO-2012/097445 A1 | 7/2012 |

OTHER PUBLICATIONS

"Advances in Desiccant-Based Dehumidification", © 2005 American Standard, TRANE Engineers Newsletter; vol. 34-4, (2005), 1-8.

"U.S. Appl. No. 12/870,545, Advisory Action mailed Jan. 24, 2014", 3 pgs.

"U.S. Appl. No. 12/870,545, Appeal Brief filed Mar. 26, 2014", 29 pgs.

"U.S. Appl. No. 12/870,545, Appeal Decision mailed Nov. 14, 2016", 12 pgs.

"U.S. Appl. No. 12/870,545, Examiner's Answer to Appeal Brief mailed Jul. 31, 2014", 12 pgs.

"U.S. Appl. No. 12/870,545, Final Office Action mailed Nov. 21, 2013", 16 pgs.

"U.S. Appl. No. 12/870,545, Non Final Office Action mailed Jul. 2, 2013", 14 pgs.

"U.S. Appl. No. 12/870,545, Preliminary Amendment filed Feb. 15, 2011", 12 pgs.

"U.S. Appl. No. 12/870,545, Preliminary Amendment filed Jul. 21, 2011", 9 pgs.

"U.S. Appl. No. 12/870,545, Preliminary Amendment filed Sep. 26, 2011", 8 pgs.

"U.S. Appl. No. 12/870,545, Reply Brief filed Aug. 20, 2014", 19 pgs.

"U.S. Appl. No. 12/870,545, Response filed Jul. 31, 2013 to Non Final Office Action mailed Jul. 2, 2013", 13 pgs.

"U.S. Appl. No. 12/870,545, Response filed Dec. 19, 2013 to Final Office Action mailed Nov. 21, 2013", 13 pgs.

"U.S. Appl. No. 13/275,633, Advisory Action mailed Jul. 13, 2015", 4 pgs.

"U.S. Appl. No. 13/275,633, Advisory Action mailed Nov. 17, 2016", 3 pgs.

"U.S. Appl. No. 13/275,633, Appeal Brief filed Jun. 16, 2014", 22 pgs.

"U.S. Appl. No. 13/275,633, Appeal Brief filed Aug. 27, 2015", 22 pgs.

"U.S. Appl. No. 13/275,633, Decision on Pre-Appeal Brief Request mailed Aug. 20, 2015", 2 pgs.

"U.S. Appl. No. 13/275,633, Final Office Action mailed Apr. 14, 2014", 15 pgs.

"U.S. Appl. No. 13/275,633, Final Office Action mailed May 6, 2015", 14 pgs.

"U.S. Appl. No. 13/275,633, Final Office Action mailed Jul. 29, 2016", 14 pgs.

"U.S. Appl. No. 13/275,633, Non Final Office Action mailed Feb. 12, 2016", 13 pgs.

"U.S. Appl. No. 13/275,633, Non Final Office Action mailed Aug. 29, 2014", 15 pgs.

"U.S. Appl. No. 13/275,633, Non Final Office Action mailed Dec. 20, 2013", 12 pgs.

"U.S. Appl. No. 13/275,633, Pre-Brief Conference Request filed Jul. 21, 2015", 5 pgs.

"U.S. Appl. No. 13/275,633, Response filed Jan. 30, 2014 to Non Final Office Action mailed Dec. 20, 2013", 12 pgs.

"U.S. Appl. No. 13/275,633, Response filed May 11, 2016 to Non Final Office Action mailed Feb. 12, 2016", 11 pgs.

"U.S. Appl. No. 13/275,633, Response filed Jul. 2, 2015 to Final Office Action mailed May 6, 2015", 11 pgs.

"U.S. Appl. No. 13/275,633, Response filed Oct. 2, 2013 to Restriction Requirement mailed Sep. 13, 2013", 2 pgs.

"U.S. Appl. No. 13/275,633, Response filed Oct. 28, 2016 to Final Office Action mailed Jul. 29, 2016", 16 pgs.

"U.S. Appl. No. 13/275,633, Response filed Nov. 3, 2014 to Non Final Office Action mailed Aug. 29, 2014", 10 pgs.

"U.S. Appl. No. 13/275,633, Restriction Requirement mailed Sep. 13, 2013", 10 pgs.

"U.S. Appl. No. 13/350,902, Appeal Brief filed Apr. 4, 2014", 24 pgs.

"U.S. Appl. No. 13/350,902, Appeal Decision mailed Sep. 30, 2016", 6 pgs.

"U.S. Appl. No. 13/350,902, Examiner's Answer mailed Jun. 16, 2014", 17 pgs.

"U.S. Appl. No. 13/350,902, Final Office Action mailed Dec. 30, 2013", 13 pgs.

"U.S. Appl. No. 13/350,902, Non Final Office Action mailed Oct. 1, 2013", 14 pgs.

"U.S. Appl. No. 13/350,902, Notice of Allowance mailed Nov. 9, 2016", 9 pgs.

"U.S. Appl. No. 13/350,902, Reply Brief filed Jul. 8, 2014", 9 pgs.

"U.S. Appl. No. 13/350,902, Response filed Aug. 5, 2013 to Restriction Requirement mailed Jul. 23, 2013", 2 pgs.

"U.S. Appl. No. 13/350,902, Response filed Oct. 29, 2013 to Non Final Office Action mailed Oct. 1, 2013", 15 pgs.

"U.S. Appl. No. 13/350,902, Restriction Requirement mailed Jul. 23, 2013", 8 pgs.

"Ashrae Technical Committee", Meeting Programs, (Jan. 29, 1997), 13 pgs.

"Australian Application Serial No. 2012208921, First Examiner Report mailed Jun. 2, 2016", 7 pgs.

"Canadian Application Serial No. 2,843,987, Office Action mailed Aug. 5, 2015", 3 pgs.

"Canadian Application Serial No. 2,843,987, Response filed Feb. 1, 2016 Office Action mailed Aug. 5, 2015", 6 pgs.

(56) References Cited

OTHER PUBLICATIONS

"Chapter 8—Heating, Ventilating, and Air Conditioning (HVAC) Demonstration", HVAC Demonstration, (published prior to Feb. 21, 2014), 16 pgs.

"Chinese Application Serial No. 201280006006.9, Office Action mailed Aug. 15, 2016", (English Translation), 18 pgs.

"Chinese Application Serial No. 201280006006.9, Response filed Dec. 30, 2016 to Office Action mailed Aug. 15, 2016", (with English Translation of Claims), 69 pgs.

"Chinese Application Serial No. 201510655570.9, Office Action mailed Feb. 2, 2016", (w/ English Summary), 19 pgs.

"Chinese Application Serial No. 201510655570.9, Office Action mailed May 13, 2015", 3 pgs.

"Chinese Application Serial No. 201510655570.9, Response filed Apr. 8, 2016 to Office Action mailed Feb. 2, 2016", English Translation of Claims, 64 pgs.

"Chinese Application Serial No. 201510655570.9, Response filed Sep. 28, 2015 to Office Action mailed May 13, 2015", English Translation of Claims, 71 pgs.

"Chinese Application Serial No. 201510655570.9, Voluntary Amendment filed Apr. 14, 2014", 61 pgs.

"Dehumidification Solutions", Des Champs Laboratories, Inc, (2001), 18 pgs.

"Desi-WringerTM Precision Desiccant Dehumidification Systems", Des Champs Technologies, (2007), 12 pgs.

"Energy Recovery—Fresh in Air Quality", SEMCO Inc., (published before Apr. 12, 2012), 131 pgs.

"European Application Serial No. 12736074.1, Extended European Search Report mailed Jul. 13, 2015", 8 pgs.

"European Application Serial No. 12736074.1, Response filed Oct. 2, 2015 to Extended European Search Report mailed Jul. 13, 2015", 10 pgs.

"International Application Serial No. PCT/CA2012/000055, International Preliminary Report on Patentability mailed Aug. 1, 2013", 9 pgs.

"International Application Serial No. PCT/CA2012/000055, International Search Report mailed May 24, 2012", 4 pgs.

"International Application Serial No. PCT/CA2012/000055, Invitation to Pay Add'l Fees and Partial Search Report Mailed Mar. 23, 2012", 2 pgs.

"International Application Serial No. PCT/CA2012/000055, Written Opinion mailed May 24, 2012", 7 pgs.

"Two-Wheel Desiccant Dehumidification System—Technology for Dehumidification and Improving Indoor Air Quality", Federal Technology Alert, (Apr. 1997), 24 pgs.

Acker, William, "Industrial Dehumidification: Water Vapor Load Calculations and System Descriptions", HPAC Heatina/Pioina/Air Conditionina, (Mar. 1999), 49-59.

Bellia, L., et al., "Air Conditioning Systems With Desiccant Wheel for Italian Climates", International Journal on Architectural Science vol. 1 No. 4, (2000), 193-213.

Bergero, Stefano, et al., "Performance analysis of a liquid desiccant and membrane contactor hybrid air-conditioning system", Bergero, Chiari, Energy and Buildings, (2010), 11 pgs.

Chant, et al., "A Steady-State Simulation of an Advanced Desiccant-Enhanced Cooling and Dehumidification System", ASHRAE Transactions: Research, (Jul. 1992), 339-347.

Coad, William J., "Conditioning Ventilation Air for Improved Performance and Air Quality", HPAC Heating/Piping/Air Conditioning, (Sep. 1999), 6 pgs.

DiBlasio, Robert, "Desicants in Hospitals—Conditioning a Research Facility", DiBlasio Engineered Systems, (Sep. 1995), 4 pgs.

Downing, "Humidity Control—No Place Like Home", Engineered Systems, (1996), 4 pgs.

Downing, et al., "Operation and Maintenance for Quality Indoor Air", Proceedings of the 7th Symposium on Improving Building Systems in Hot and Humid Climates, Ft. Worth, TX, (Oct. 9, 1990), 5 pgs.

Fischer, "Active Desiccant Dehumidification Module Integration With Rooftop Packaged HVAC Units—Final Report Phase 3B", Oak Ridge National Laboratory, (Mar. 2002), 36 pgs.

Fischer, John C., "Optimizing IAQ, Humidity Control, and Energy Efficiency in School Environments Through the Application of Desiccant-Based Total Energy Recovery Systems", IAQ '96. Atlanta: Paths to Better Building Environments/Environmental Effects on Heath and Productivity, (1996), 179-194.

Harriman, III, et al., "Dehumidification and Cooling Loads From Ventilation Air", ASHRAE Journal, (Nov. 1997), 7 pgs.

Harriman, III, et al., "Evaluating Active Desiccant Systems for Ventilating Commercial Buildings", ASHRAE Journal, (Oct. 1999), 7 pgs.

Harriman, III, et al., "New Weather Data for Energy Calculations", ASHRAE Journal, (Mar. 1999), 7 pgs.

Jeong, et al., "Energy Conservation Benefits of a Dedicated Outdoor Air System with Parallel Sensible Cooling by Ceiling Radiant Panels", ASHRAE Transactions; vol. 109• Part 2, (2003), 10 pgs.

Kosar, et al., "Dehumidification Issues of Standard 62-1989", ASHARE Journal, (Mar. 1998), 71-75.

McGahey, Kevin, et al., "Desiccants: Benefits for the Second Century of Air Conditioning", Proceedings of the Tenth Symposium on Improving Building Systems in Hot and Humid Climates, Ft. Worth, Texas, (May 14, 1996), 9 pgs.

McGahey, Kevin, "New Commercial Applications for Desiccant-Based Cooling", ASHARE Journal, (Jul. 1998), 41-45.

Mumma, Stanley A. "Overview of Integrating Dedicated Outdoor Air Systems With Parallel Terminal Systems", ASH RAE Transactions vol. 107; Part 1, (2001), 7 pgs.

Mumma, Stanley A., et al., "Achieving Dry Outside Air in an Energy-Efficient Manner", ASH RAE Transactions 2001; vol. 107; Part 1, (2001), 8 pgs.

Mumma, Stanley A., "Dedicated Outdoor Air-Dual Wheel System Control Requirements", ASHRAE Transactions 2001; vol. 107; Part 1, (2001), 9 pgs.

Mumma, Stanley A., et al., "Extension of the Multiple Spaces Concept of ASH RAE Standard 62 to Include Infiltration, Exhaust/Exfiltration, Interzonal Transfer, and Additional Short-Circuit Paths", ASHRAE Transactions: Symposia, (1998), 1232-1241.

Nimmo, B. G., et al., "DEAC: Desiccant Enhancement of Cooling-Based Dehumidification", ASHRAE Transactions: Symposia, (1993), 842-848.

Qin, C. K., et al., "Engine-driven Desiccant-assisted Hybrid Air-conditioning System", 23rd World Gas Conference, Amsterdam, (2006), 15 pgs.

Scofield, et al., "HVAC Design for Classrooms: Divide and Conquer", Heating/Piping/Air Conditioning, (May 1993), 53-59.

Sevigny, et al., "Air Handling Unit Direct Digital Control System Retrofit to Provide Acceptable Indoor Air Quality and Global Energy Optimization", Energy Engineering; vol. 94; No. 5, (1997), 24-43.

Shank, et al., "Selecting the Supply Air Conditions for a Dedicated Outdoor Air System Working in Parallel with Distributed Sensible Cooling Terminal Equipment", ASHRAE Transactions vol. 107; Part 1, (2001), 10 pgs.

Smith, Christopher S., et al., "Outdoor Air, Heat Wheels and JC Penny: A New Approach to Retail Ventilation", Proceedings of the Eleventh Symposium on Improving Building Systems in Hot and Humid Climates, Ft. Worth, Texas, (Jun. 2, 1998), 1 pg.

Smith, James C., "Schools Resolve IAQ/Humidity Problems with Desiccant Preconditioning", Heating/Piping/Air Conditioning, (Apr. 1996), 6 pgs.

Swails, et al., "A Cure for Growing Pains", Consulting Specifying Engineer, [Online] retrieved from the internet:www.csermag.com, (Jun. 1997), 4 pgs.

Turpin, "Dehumidification: The Problem No One Wants to Talk About (Apr. 2000)", [online] [retrieved on May 6, 2011]. Retrieved from the Internet: http//www.esmagazine.com/copyrighVde12c1c879ba801 0VgnVCM1 00000f932a8c0_?>, (posted on Apr. 5, 2000), 6 pgs.

Yborra, Stephen C., "Field Evaluation of Desiccant-Integrated HVAC Systems: A Review of Case Studies in Multiple Commercial/Institutional Building Types", Proceedings of the Eleventh Sympo-

(56) References Cited

OTHER PUBLICATIONS sium on Improving Building Systems in Hot and Humid Climates, Ft. Worth, Texas, (Jun. 2, 1998), 361-370.
"U.S. Appl. No. 12/870,545, Corrected Notice of Allowance dated Mar. 14, 2017", 7 pgs.
"U.S. Appl. No. 12/870,545, Corrected Notice of Allowance dated Mar. 23, 2017", 7 pgs.
"U.S. Appl. No. 12/870,545, Notice of Allowance filed Feb. 27, 2017", 9 pgs.
"U.S. Appl. No. 13/275,633, Advisory Action dated Mar. 30, 2017", 3 pgs.
"U.S. Appl. No. 13/275,633, Appeal Brief filed Feb. 27, 2017", 29 pgs.
"U.S. Appl. No. 13/350,902, Notice of Allowance dated Mar. 1, 2017", 7 pgs.
"Chinese Application Serial No. 201510655570.9, Office Action dated Apr. 1, 2017", w/ English translation, 14 pgs.
"European Application Serial No. 12736074.1, Communication Pursuant to Article 94(3) EPC dated Feb. 9, 2017", 4 pgs.

* cited by examiner

HEAT PUMP DEFROSTING SYSTEM AND METHOD

CROSS-REFERENCE TO RELATED APPLICATIONS

The present application relates to and claims priority benefits from U.S. Provisional Patent Application No. 61/778,681, entitled "Air Source Heat Pump System and Method," filed Mar. 13, 2013, which is hereby expressly incorporated by reference in its entirety.

BACKGROUND OF THE DISCLOSURE

Embodiments of the present disclosure generally relate to a heat pump system and method, and, more particularly, to a system and method of efficiently operating a heat pump in a defrost mode.

An air-to-air heat pump, also known as an air source heat pump ("ASHP"), is generally a heating and cooling system that uses return air, regeneration air and/or outside air as a heat source and heat sink. An ASHP absorbs heat from the return/regeneration air and/or outside air and releases the heat to an enclosed space during a winter mode. Any heat source, including outside air, return air, or regeneration air) that has a temperature above absolute zero contains some heat. An ASHP pumps some of the heat from the heat source, for example.

Existing ASHPs generally include a supply air channel and a regeneration air channel. An energy exchange module typically extends between the supply air channel and the regeneration air channel. The energy exchange module transfers sensible and/or latent heat between the outside air in the supply air channel and the regeneration air in the regeneration air channel. The supply air channel and the regeneration air channel also typically include heat exchangers. The supply air channel includes a supply air heat exchanger and the regeneration air channel includes a regeneration air heat exchanger. The supply air heat exchanger and the regeneration air heat exchanger are in fluid communication through a refrigeration system that is configured to further transfer heat between the outside air and the regeneration air. In a winter mode, heat and/or moisture in the regeneration air is transferred to the outside air to generate heated and/or humidified supply air that is discharged from the supply air channel. During a summer mode, heat and moisture in the outside air is transferred to the regeneration air to generate cooled and dehumidified supply air that is discharged from the supply air channel.

However, conventional heat pump systems are not without their disadvantages. During winter modes, when the outside temperature drops below approximately 33-35° F., frost may form on the coils of the regeneration air heat exchanger. Accordingly, the heat pump system is typically shut down so that the coils can be defrosted. During the time period that the heat pump system is shut down, the building having the heat pump system typically is without a heat source or utilizes an auxiliary heat source. Additionally, during summer modes, the regeneration air heat exchanger may be required to supply large amounts of heat to the regeneration air. As a result, an efficiency of the regeneration air heat exchanger may substantially decrease.

Some systems include a pre-conditioning coil that is used to preheat the regeneration air during winter modes. The pre-conditioning coil is operable to prevent or minimize frost from forming on the regeneration air heat exchanger. However, the available energy in a refrigeration system is limited. The more energy that is provided to the pre-conditioning coil to prevent or minimize frost formation on the regeneration air heat exchanger, the less energy that is available for the supply air heat exchanger. Yet, if less energy is provided to the pre-conditioning coil, frost may accumulate more quickly on the regeneration heat exchanger. As frost accumulates on the regeneration heat exchanger, the efficiency of the heat exchanger decreases. As such, energy that is provided to the pre-conditioning coil that is configured to prevent or minimize frost formation on the regeneration air heat exchanger is energy that is not available for the supply air heat exchanger.

When ambient temperature is below 15° F., for example, much of the refrigerant is diverted to the pre-conditioning coil in order to prevent frost formation on the regeneration air heat exchanger. In order to capture useful heat in the regeneration air stream in an ASHP, the relative humidity ratio of the air leaving the regeneration air heat exchanger is typically above 80%. Indeed, the relative humidity ratio generally approaches 100% in order to be effective. In general, when a relative humidity ratio is above 80%, frost formation may increase. In order to provide effective frost prevention by way of a pre-conditioning coil, a relative humidity ratio of air leaving the pre-conditioning coil is typically limited to below 80% relative humidity. However, providing energy to the pre-conditioning coil in such a manner may decrease the overall system efficiency as useful or captured energy in the regeneration heat exchanger is simply expelled to the pre-conditioner and not the supply air heat exchanger. Alternatively, diverting only a portion of the hot gases to the pre-conditioner coil could effectively minimize and reduce frost formation on the regeneration heat exchanger and further increase the delay between required defrost cycles.

The primary defrosting method utilized in a typical ASHP is a reverse cycle defrost. In a typical reverse cycle defrost system, a reversing valve is switched from the heating position to the cooling position. The change in reversing valve position changes the flow of refrigerant in the refrigeration systems and sends all of the hot refrigerant to the regeneration/return air heat exchanger to defrost the ice that has accumulated. During the reverse cycle defrost, air flow across the regeneration air heat exchanger is interrupted to speed up the ice melting process. However, during this time, the supply air heat exchanger cools the supply air stream and discharges cold air to the enclosed space in winter. As such, an auxiliary heating source may be utilized to offset the supply air temperature drop.

Recent developments include attempts to fractionalize either the refrigeration cycle into smaller individual segments and/or sub-divide the air heat exchangers in the refrigeration circuit into multiple sub-sections. The primary goal is to alternate sub sections of the refrigeration system and/or heat exchangers with the objective being to continuously heat the supply air while sequentially defrosting portions of the regeneration/return air heat exchanger(s). In general, fractional systems may efficiently operate when the supply air is continuously heated with a compressorized system, while sequentially defrosting sub sections of the regeneration/return heat exchanger. However, when the regeneration heat exchanger sub-section is defrosted and a portion of the hot gas is diverted to the regeneration heat exchanger for melting ice build-up, there may be a reduction in the supply air temperature downstream from the supply air heat exchanger.

Further, when ice melts off the regeneration/return air heat exchanger and or sub-sections, the resulting water travels and runs to the bottom of the coil on the downstream side. The air on the downstream side of the regeneration air heat exchanger may be below freezing, so the draining water may freeze and subsequently accumulate in the drain pan. Heat wires in the drain pan may be used to prevent the re-freezing, yet using additional heating elements may increase the overall power consumption of the system.

Additionally, some heat exchanger fins may be corrugated and have a perforated surface configured to increase turbulence flow on the surface of the fin and ultimately increase heat transfer characteristics. While the corrugated fin surface increases heat exchange performance between the refrigerant and the air, the additional edges, surfaces, and smaller cavities increase the attractive forces (Van der Waals forces) of the water molecules to the fin surfaces. As such, during a defrost cycle, a significant quantity of water may remain within the coil fins and may not drain to and out the bottom of the coil. During the subsequent heating cycle, the remaining water may freeze in the regeneration/return air heat exchanger and reduce the amount of effective run time before the next defrost cycle.

SUMMARY OF THE DISCLOSURE

Certain embodiments of the present disclosure provide a heat pump system configured to provide conditioned air to an enclosed space. The heat pump system may include a supply air channel configured to receive air and discharge supply air into the enclosed space, a regeneration air channel configured to receive regeneration air from the enclosed space and discharge exhaust air, and a regeneration air heat exchanger positioned in the regeneration air channel. The regeneration air heat exchanger may be configured to remove heat from the regeneration air during a heating cycle. The regeneration air heat exchanger may be configured to operate in a normal heating mode and a defrost mode. The heat pump system may also include at least one damper positioned proximate to the regeneration air heat exchanger. The damper(s) may include a plurality of actuatable portions. Each of the actuatable portions may be configured to independently operate. The damper(s) is configured to sequentially open and close each of the plurality of actuatable portions during the defrost mode.

The heat pump system may also include a refrigeration circuit operatively connected to the regeneration air heat exchanger. Hot refrigerant may be used to directly and sequentially defrost the regeneration air heat exchanger. The refrigeration circuit may include a compressor that is configured to be overdriven during the defrost mode.

The heat pump system may also include an energy recovery module that extends between the supply air channel and the regeneration air channel. The energy recovery module may be configured to remove heat and moisture from the regeneration air during the normal mode. The heat pump system may also include a control module configured to sense at least one condition of the refrigeration circuit and control the output of the compressor in response to the sensed condition. The control module may also be configured to control operation of the energy recovery module. The control module may be configured to control movement of the hot refrigerant through the refrigeration circuit and the damper(s) in order to reduce frost formation on the energy recovery module or the regeneration air heat exchanger.

The regeneration air heat exchanger may be angled within the regeneration air channel. The angle of the regeneration air channel is configured to allow water to shed to an upstream side of the heat exchanger during the defrost mode.

Certain embodiments of the present disclosure provide a heat pump system configured to provide conditioned air to an enclosed structure. The heat pump system may include a refrigeration circuit operatively connected to a regeneration air heat exchanger. Hot refrigerant is used to directly and sequentially defrost the regeneration air heat exchanger.

In at least one embodiment, a metering device may be configured to regulate a quantity of liquid refrigerant in a supply air heat exchanger in a heating cycle, or regulate the quantity of liquid refrigerant in the regeneration air heat exchanger in a cooling cycle.

Certain embodiments of the present disclosure provide a method of providing conditioned air to an enclosed space. The method may include positioning a regeneration air heat exchanger in a regeneration air channel of a heat pump, using the regeneration air heat exchanger to remove heat from regeneration air within the regeneration air channel during a heating cycle, independently operating each of a plurality of actuatable portions of at least one damper positioned proximate to the regeneration air heat exchanger, and sequentially opening and closing each of the plurality of actuatable portions during a defrost mode. The method may also include operatively connecting a refrigeration circuit to the regeneration air heat exchanger, and directly and sequentially defrosting the regeneration air heat exchanger with hot refrigerant that is circulated within the refrigeration circuit.

Certain embodiments of the present disclosure provide a method of providing conditioned air to an enclosed space. The method may include directly and sequentially defrosting portions of the regeneration air heat exchanger with hot refrigerant that circulates through a refrigerant circuit.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Embodiments of the present disclosure provide heat pump systems that may include one or more dampers positioned on or proximate to a heat exchanger. The damper(s) are configured to selectively allow and prevent air from passing through the heat exchanger. The damper(s) may include portions that are configured to operate independently from each other. For example, the damper(s) may be configured to selectively open and close the portions so that areas of the heat exchanger are defrosted while normal operation (such as a normal heating operation or cycle) continues. For example, a defrost mode may occur simultaneously with a normal heating mode. As one example, the defrost mode may occur during an entire normal heating mode. As another example, the defrost mode may occur during a portion of the normal heating mode. In short, the defrost mode may occur simultaneously with the normal heating mode in that it may occur during at least a portion of the normal heating mode. A refrigeration circuit may be operatively connected to the heat exchanger. Hot refrigerant may be used to directly and sequentially defrost the heat exchanger, for example.

Figure 1:
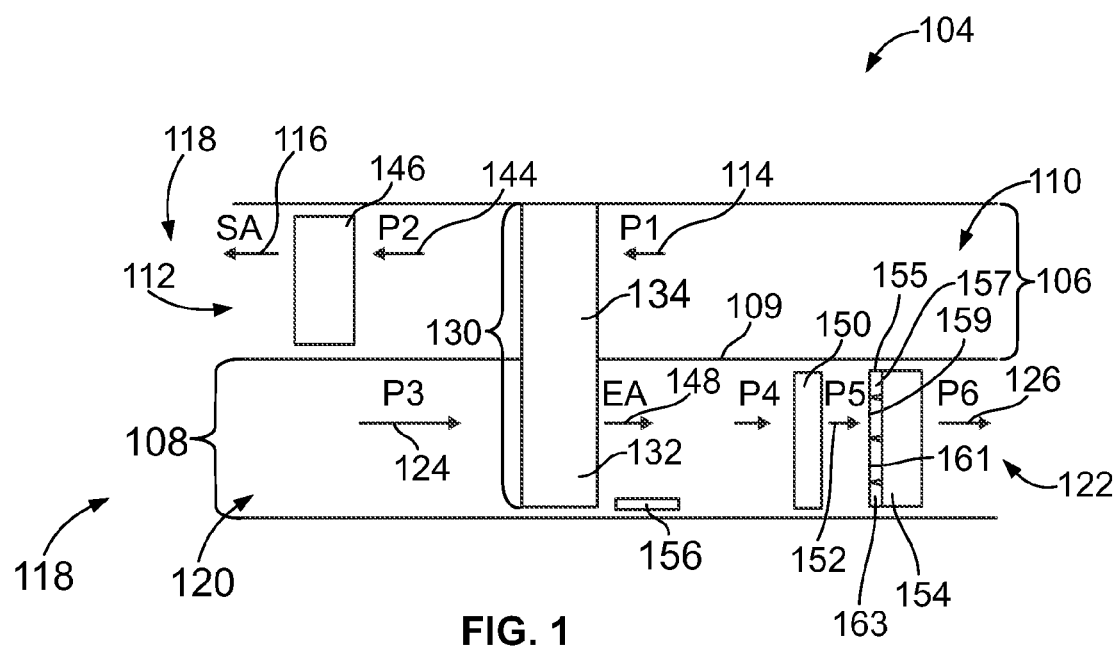
FIG. 1 illustrates a schematic diagram of a heat pump system configured to operate in a winter mode, according to an embodiment of the present disclosure.

FIG. 1 illustrates a schematic diagram of a heat pump system 104 configured to operate in a winter mode, according to an embodiment of the present disclosure. The heat pump system 104 may be in fluid communication with a refrigerant system 102 (shown in FIG. 2). The heat pump system 104 is configured to exchange sensible and latent heat between a supply air channel 106 and a regeneration air channel 108. Alternatively, in at least one embodiment, the heat pump system 104 may be utilized to transfer only sensible heat. The supply air channel 106 may be positioned adjacent to the regeneration air channel 108. The supply air channel 106 and the regeneration air channel 108 may be separated by a partition 109. The supply air channel 106 extends between an inlet 110 and an outlet 112. The inlet 110 receives outside or ambient air 114. The outlet 112 discharges supply air 116 into an enclosed space 118. The enclosed space 118 may be a building, room, tent, other such enclosed structure, or the like. The regeneration air channel 108 includes an inlet 120 and an outlet 122. The inlet 120 receives regeneration air 124 from the enclosed space 118. For example, the regeneration air 124 may include return air from the space 118. The outlet 122 discharges exhaust air 126 into the outside atmosphere.

An energy recovery module 130 may extend between the regeneration air channel 108 and the supply air channel 106. In at least one embodiment, the heat pump system 104 may be an air-to-air heat pump that does not include the energy recovery module 130. The energy recovery module 130 may include a regeneration air side 132 and a supply air side 134. The regeneration air side 132 is positioned in the regeneration air channel 108. The supply air side 134 is positioned in the supply air channel 106. The energy recovery module 130 transfers sensible and latent heat between the regeneration air side 132 and the supply air side 134. The energy recovery module 130 transfers sensible and latent heat between the supply air channel 106 and the regeneration air channel 108. In an embodiment, the energy recovery module 130 may be a plate-type heat exchanger, an energy recovery wheel, heat pipe, enthalpy pump, or the like.

In at least one embodiment, the supply air channel 106 may include a preheater. It should be noted that the preheater is an optional component that may be excluded from the heat pump system 104. The preheater may be positioned upstream from the supply air side 134 of the energy recovery module 130. The preheater may receive and heat the outside air 114 to generate heated air. Optionally, the outside air 114 flows directly to the supply air side 134 of the energy recovery module 130. The supply air side 134 of the energy recovery module receives the outside air 114. The energy recovery module 130 transfers heat and moisture between the outside air 114 in the supply air side 134 and the regeneration air 124 in the regeneration air side 132 to generate pre-conditioned outside air 144. The supply air stream may include a supply air heat exchanger 146 positioned downstream from the supply air side 134 of the energy recovery module 130. The supply air heat exchanger 146 receives the pre-conditioned outside air 144 and generates the supply air 116.

In the regeneration air channel 108, the regeneration air side 132 of the energy recovery module 130 receives the regeneration air 124. The energy recovery module 130 transfers sensible and latent heat between the regeneration air 124 in the regeneration air side 132 and the outside air 114 in the supply air side 134 to generate pre-conditioned regeneration air 148. A pre-processing module 150 may be positioned downstream from the regeneration air side 132 of the energy recovery module 130. In at least one embodiment, the pre-processing module 150 may be a heat exchanger or the like. The pre-processing module 150 receives and heats the pre-conditioned regeneration air 148 to generate pre-heated air 152. A regeneration air heat exchanger 154 is positioned downstream from the pre-processing module 150. In an embodiment, the pre-processing module 150 may be mounted to the regeneration air heat exchanger 154 within the same frame or casing. The regeneration air heat exchanger 154 receives the pre-heated air 152 and generates the exhaust air 126. The regeneration air heat exchanger 154 is fluidly coupled to the supply air heat exchanger 146. The regeneration air heat exchanger 154 and the supply air heat exchanger 146 transfer heat between the pre-heated air 152 and the pre-conditioned outside air 144.

The regeneration air channel 108 may also include a damper 156 positioned between the regeneration air side 132 of the energy recovery module 130 and the pre-processing module 150. The damper 156 may be opened to allow outside air to mix with the pre-conditioned regeneration air 148 prior to entering the pre-processing module 150.

In at least one embodiment, in the winter mode, the heat pump system 104 is capable of operating at temperatures as low as approximately 5° F. In other embodiments, the heat pump system 104 may be capable of operating at temperatures below approximately 5° F. In the winter mode, the regeneration air 124 includes warm humidified air and the outside air 114 includes cool dehumidified air.

The outside air 114 enters the inlet 110 of the supply air channel 106. The outside air 114 is channeled to the supply air side 134 of the energy recovery module 130. The outside air 114 may first be heated by a preheater prior to entering the supply air side 134 of the energy recovery module 130. In the supply air side 134 of the energy recovery module 130, the supply air 116 receives heat and moisture from the regeneration air 124 flowing through the regeneration air side 132 of the energy recovery module 130. The energy recovery module 130 generates warm humidified pre-conditioned outside air 144. The pre-conditioned outside air 144 flows downstream to the supply air heat exchanger 146. In the winter mode, the supply air heat exchanger 146 operates as a condenser to heat the pre-conditioned outside air 144. The supply air heat exchanger 146 receives heat from the regeneration air heat exchanger 154. The pre-conditioned outside air 144 receives heat from the supply air heat exchanger 146 to generate warm humidified supply air 116. The warm humidified supply air 116 is discharged into the space 118.

The regeneration air channel 108 receives the warm humidified regeneration air 124 from the space 118. The regeneration air 124 flows downstream to the regeneration air side 132 of the energy recovery module 130. The regeneration air side 132 of the energy recovery module 130 removes heat and moisture from the regeneration air 124. The heat and moisture is transferred to the supply air side 134 of the energy recovery module 130 to heat and humidify the outside air 114. The regeneration air side 132 of the energy recovery module 130 generates cool dehumidified pre-conditioned regeneration air 148. In the winter mode, the damper 156 is closed so that the pre-conditioned regeneration air 148 is not mixed with outside air. The pre-conditioned regeneration air 148 is channeled to the pre-processing module 150. In at least one embodiment, the pre-conditioned regeneration air 148 is channeled to the pre-processing module 150 when the outside air 114 has a temperature less than approximately 35° F. The pre-processing module 150 heats the pre-conditioned regeneration air 148 to generate the pre-heated air 152. In at least one embodiment, when the heat pump system 104 is receiving outside air 114 that has a temperature greater than 35° F., the pre-processing module 150 may be shut-off so that the pre-conditioned regeneration air 148 flows through the pre-processing module 150 unchanged. In at least one embodiment, the pre-conditioned air 148 by-passes the pre-processing module 150. In at least one embodiment, the pre-processing module 150 can be used to dehumidify the regeneration air 148 prior to entering the regeneration air heat exchanger 154, thus minimizing frost formation when outside air 114 has a temperature less than 20° F. In another embodiment, the pre-processing module 150 can be used to heat the regeneration air 148 with low grade heat or waste heat prior to entering the regeneration air heat exchanger 154, thus increasing efficiency of the heat pump system 104.

The pre-conditioned air 152 may be channeled downstream to the regeneration air heat exchanger 154. In the winter mode, the regeneration air heat exchanger 154 operates as an evaporator to cool and dehumidify the pre-conditioned or pre-heated air 152 and generate cool dehumidified exhaust air 126. The cool dehumidified exhaust air 126 is discharged into the atmosphere. The pre-processing module 150 heats the pre-conditioned regeneration air 148 to prevent and/or minimize frost formation on the regeneration air heat exchanger 154 during the winter mode. In particular, when operating the heat pump system 104 at outside air temperatures below approximately 35° F., frost may form on the regeneration air heat exchanger 154 as the regeneration air heat exchanger 154 generates the cool dehumidified exhaust air 126. Heating and/or dehumidifying the pre-conditioned regeneration air 148 allows the regeneration air heat exchanger 154 to generate cool dehumidified exhaust air 126 that does not significantly exceed a saturation point of the air. By preventing and/or minimizing saturation of the cool dehumidified exhaust air 126, condensation and frost formation on the regeneration air heat exchanger 154 may be avoided and/or minimized. Accordingly, frost formation on the coils of the regeneration air heat exchanger 154 may be prevented by pre-heating and/or dehumidifying the pre-conditioned regeneration air 148.

Additionally, a damper 155 may be positioned in the regeneration air channel 108 between the pre-processing module 150 and the regeneration air heat exchanger 154. The damper 155 is proximate to the regeneration air heat exchanger 154. For example, the damper 155 may be mounted directly on an upstream side of the heat exchanger 154. Optionally, the damper 155 may be spaced a distance from the regeneration air heat exchanger 154. The damper 155 includes actuatable portions 157, 159, 161 and 163 that may be selectively opened and closed. When each actuatable portion 157, 159, 161 and 163 is opened, the pre-heated air 152 may flow through the open portion 157, 159, 161 and/or 163 and through an area of the regeneration air heat exchanger 154 that is aligned with the open portion 157, 159, 161 and/or 163. When each actuatable portion 157, 159, 161 and 163 is closed, the pre-heated air 152 is prevented from flowing through the closed portion 157, 159, 161 and/or 163 and passing into the respective aligned area of the regeneration air heat exchanger 154.

The actuatable portions 157, 159, 161 and/or 163 operate independently from each other. For example, the damper 155 may be configured to selectively open and close certain portions 157, 159, 161 and/or 163 so that areas of the regeneration air heat exchanger 154 are defrosted while normal operation continues. A refrigeration circuit may be operatively connected to the regeneration air heat exchanger 154, as explained below. Hot refrigerant may be used to directly and sequentially defrost the regeneration air heat exchanger 154.

As an example, sub-sections or distinct areas of the regeneration air heat exchanger 154 may be operatively connected to a compressor of a refrigerant circuit through separate and distinct hot refrigerant bypass lines. The bypass lines may include valves, such as solenoid valves, that may be operated to selectively allow and prevent hot refrigerant from passing into the sub-sections or distinct areas of the regeneration air heat exchanger. A sub-section or distinct area of the regeneration air heat exchanger 154 may be defrosted by hot refrigerant, while the remaining sections are not defrosted, but instead operate in a normal heating mode (in which hot refrigerant is not bypasses thereto, actuatable portions are open, thereby allowing air to flow therethrough). After the first sub-section or distinct area is defrosted, the respective bypass line is closed by the solenoid valve, and the next sub-section receives hot refrigerant in order to defrost the next sub-section (such as through a respective solenoid valve opening the bypass line). The process repeats for each and every sub-section or distinct area of the regeneration air heat exchanger 154. Accordingly, sub-sections or distinct areas of the regeneration air heat exchanger 154 may be directly and sequentially defrosted at the same time a normal heating mode or cycle occurs.

While the damper 155 is shown having the four portions 157, 159, 161 and/or 163, it is to be understood that more or less portions may be used. For example, the damper 155 may include three or less actuatable portions, five or more actuatable portions, or the like. Moreover, each actuatable portion may be a separate and distinct damper.

Figure 2:
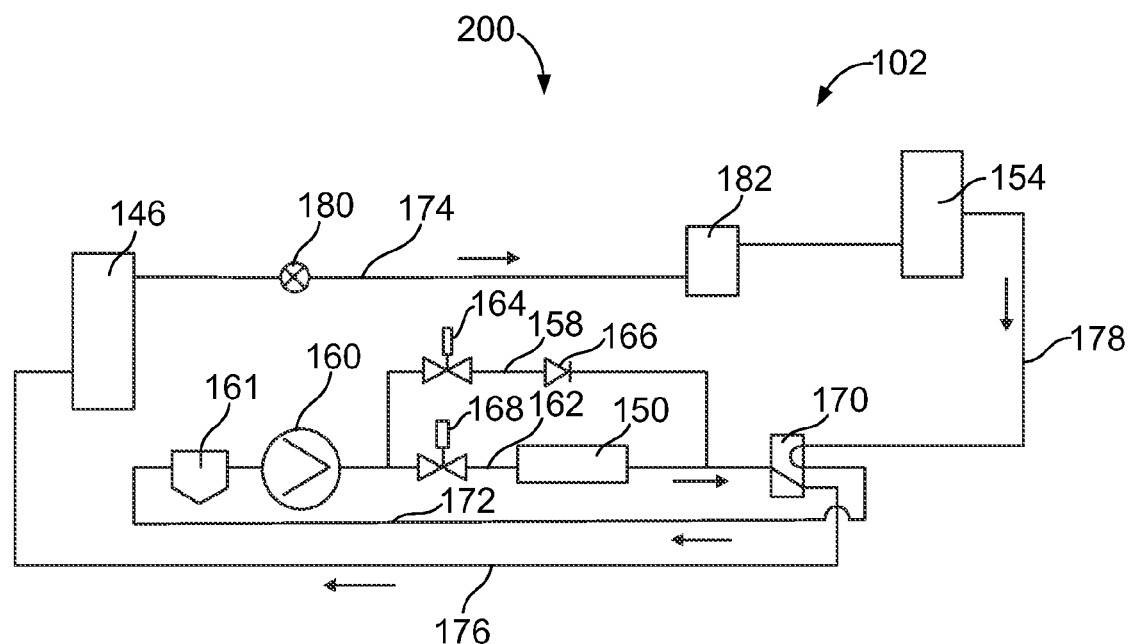
FIG. 2 illustrates a schematic diagram of a refrigerant system configured to operate in a winter mode, according to an embodiment of the present disclosure.

FIG. 2 illustrates a schematic diagram of a refrigerant system 102 configured to operate in the winter mode, according to an embodiment of the present disclosure. The refrigerant system 102 includes a refrigerant flowing therethrough. The refrigerant system 102 includes a compressor 160 that conditions the refrigerant to achieve the required temperature and pressure conditions for the refrigerant system 102. A suction accumulator 161 may be positioned upstream of the compressor 160 to avoid a flow of liquid refrigerant into the compressor 160. In at least one embodiment, a suction accumulator may be positioned upstream of the compressor 160 to avoid a flow of liquid refrigerant into the compressor 160. A pre-processing circuit 162 and a bypass circuit 158 are positioned downstream of, and fluidly coupled to, the compressor 160. A bypass valve 164 and a check valve 166 may be positioned within the bypass circuit 158. In one embodiment, a check valve may be positioned at the pre-processing module 150 outlet to avoid refrigerant migration. A pre-processing valve 168 and the pre-processing module 150 may be positioned in the pre-processing circuit 162 so that the pre-processing module 150 is fluidly coupled to the compressor 160. In at least one embodiment, an additional refrigeration system control valve may be positioned downstream of the module 150. The bypass circuit 158 and the pre-processing circuit 162 are in fluid communication with a four-way valve 170. An accumulator circuit 172 may be in fluid communication between the four-way valve 170 and the suction accumulator 161.

A heat exchange circuit 174 may be in fluid communication with the four way valve 170 and the heat pump system 104. The heat exchange circuit 174 includes a first end 176 and a second end 178. The first end 176 and the second end 178 of the heat exchange circuit 174 are both in fluid communication with the four-way valve so that the heat exchange circuit 174 both receives and returns refrigerant to the four-way valve 170. The supply air heat exchanger 146 and the regeneration air heat exchanger 154 are positioned within the heat exchange circuit 174. A valve 180 and a receiver 182 are positioned within the heat exchange circuit 174 between the supply air heat exchanger 146 and the regeneration air heat exchanger 154. It should be noted that the components illustrated in the refrigerant system 102 are exemplary only and the refrigerant system 102 may include other components.

The pre-processing module 150 is coupled in fluid communication with both the supply air heat exchanger 146 and the regeneration air heat exchanger 154. The pre-processing module 150 is fluidly coupled between the supply air heat exchanger 146 and the regeneration air heat exchanger 154 in a common refrigerant path through the refrigerant system 102.

In the winter mode, refrigerant in the compressor 160 flows downstream to at least one of the bypass circuit 158 or the pre-processing circuit 162. The bypass valve 164 and the pre-processing valve 168 are controlled based on a refrigerant requirement of the pre-processing module 150. For example, when operating at higher outside temperatures, the pre-processing module 150 requires less refrigerant flow. Accordingly, the bypass valve 164 and the pre-processing valve 168 are controlled to channel more refrigerant through the bypass circuit 158. As the outside temperature decreases, the pre-processing module 150 may utilize increased refrigerant flow. Accordingly, the bypass valve 164 and the pre-processing valve 168 are controlled to channel more refrigerant through the pre-processing circuit 162. In at least one embodiment, when the outside temperature reaches approximately 5° F., the bypass valve 164 may be closed and the pre-processing valve 168 may be fully opened so that all of the refrigerant flows through the pre-processing circuit 162 and the pre-processing module 150. In at least one embodiment, an additional refrigerant flow control device may be positioned downstream of the module 150. The pre-processing module 150 heats the pre-conditioned regeneration air 148 in the regeneration air channel 108. The refrigerant in the bypass circuit 158 and the pre-processing circuit 162 then flows downstream to the four-way valve 170.

In the winter mode, the four-way valve 170 couples the bypass circuit 158 and the pre-processing circuit 162 in fluid communication with the first end 176. The refrigerant flows through the circuit 176 to the supply air heat exchanger 146. The refrigerant in the supply air heat exchanger 146 provides heat to the pre-conditioned outside air 144. Then, the refrigerant flows through the circuit 174 to the regeneration air heat exchanger 154. The regeneration air heat exchanger 154 receives heat from the pre-heated air 152. The refrigerant then flows downstream to the four-way valve 170. In the winter mode, the four-way valve 170 couples the second end 178 of the heat exchange circuit 174 to the accumulator circuit 172 to return the refrigerant from the heat exchange circuit 174 to the compressor 160.

Figure 3:
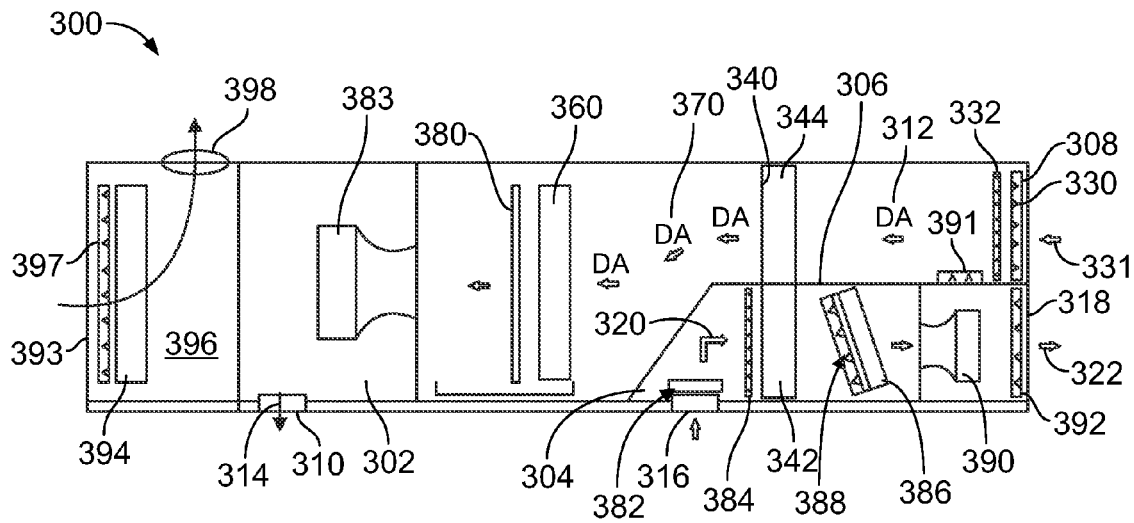
FIG. 3 illustrates a schematic diagram of a heat pump system, according to an embodiment of the present disclosure.

FIG. 3 illustrates a schematic diagram of a heat pump system 300, according to an embodiment of the present disclosure. The heat pump system 300 may be in fluid communication with a refrigerant system, such as the refrigerant system 102 shown in FIG. 2. The heat pump system 300 may be configured to exchange sensible and latent heat between a supply air channel 302 and a regeneration air channel 304. The supply air channel 302 may be positioned adjacent to the regeneration air channel 304. The supply air channel 302 and the regeneration air channel 304 may be separated by a partition 306. The supply air channel 302 extends between an inlet 308 and an outlet 310. The inlet 308 receives outside or ambient air 312. The outlet 310 discharges supply air 314 into an enclosed space, such as a building, room, enclosed structure, or the like.

An outside air damper 330 may be proximate to the inlet 308. The outside air damper 330 is configured to be selectively actuated between open and closed positions in order to selectively allow and prevent outside air 331 from entering into the supply air channel 302. An air filter 332 may be positioned downstream from the damper 330. The air filter 332 is configured to filter contaminants and impurities from the outside air 331.

The regeneration air channel 304 includes an inlet 316 and an outlet 318. The inlet 316 receives regeneration air 320. The regeneration air 320 may include return air from the enclosed space. The outlet 318 discharges exhaust air 322 into the outside atmosphere.

An energy recovery module 340 may extend between the regeneration air channel 304 and the supply air channel 302. Alternatively, the system 300 may not include the energy recovery module 130. The energy recovery module 300 may include a regeneration air side 342 and a supply air side 344. The regeneration air side 342 is positioned in the regeneration air channel 304. The supply air side 344 is positioned in the supply air channel 302. The energy recovery module 340 transfers sensible and latent heat between the regeneration air side 342 and the supply air side 344. The energy recovery module 340 transfers sensible and latent heat between the supply air channel 302 and the regeneration air channel 304. In at least one embodiment, the energy recovery module 340 may be a plate-type heat exchanger, an energy recovery wheel, heat pipe, enthalpy pump, or the like.

The supply air channel 302 may include a supply air heat exchanger 360 positioned downstream from the supply air side 344 of the energy recovery module 340. The supply air heat exchanger 360 receives the pre-conditioned outside air 370 and generates the supply air 314.

A hot gas reheat coil 380 may also be positioned within the supply air channel 302. The hot gas reheat coil 380 may be downstream from the supply air heat exchanger 360 within the supply air channel 302. The hot gas reheat coil 380 is configured to further heat the supply air 314 after it has passed from the supply air heat exchanger 360, but before the supply air 314 is supplied to the enclosed space.

A fan 383 may also be positioned within the supply air channel 302. The fan 383 is configured to move air through the supply air channel 302. The fan 383 may be positioned anywhere within the supply air channel 302. Alternatively, the system 300 may not include the fan 383.

In the regeneration air channel 304, the regeneration air side 342 of the energy recovery module 340 receives the regeneration air 320. A heater 382 may be located at or proximate to the inlet 316 upstream from the regeneration air side 342. The heater 382 may be used to heat the regeneration air 320 before it encounters the energy recovery device 340. An air filter 384 may be positioned within the regeneration air channel 304 upstream from the regeneration air side 342 of the energy recovery module 340. The air filter 384 is configured to filter contaminants and impurities from the regeneration air 320.

A regeneration air heat exchanger 386 is positioned within the regeneration air channel 304 downstream from the regeneration air side 342 of the energy recovery module 340. A damper 388 may be positioned upstream from the regeneration air heat exchanger 386 and downstream from the energy recovery module 340 within the regeneration air channel 304. The damper 388 may include actuatable portions that are configured to be selectively opened and closed, as described above. Thus, a first portion may be opened, while a second portion may be closed. Each portion of the damper 388 may be closed in order to allow air to pass through certain portions of the regeneration air heat exchanger 386. Accordingly, different portions of the regeneration air heat exchanger 386 may be defrosted with hot refrigerant, as discussed below, while other portions continue to operate in a normal fashion, such as in a normal heating mode or cycle.

The heater 382 may be used to heat the regeneration air 320 before it encounters the energy recovery module 340 and the regeneration air heat exchanger 386. As such, the energy recovery module 340 and the regeneration air heat exchanger 386 are less susceptible to frost accumulation. Alternatively, the heater 386 may be located upstream from the supply air side 344 of the energy recovery module 340. Also, alternatively, the heater 382 may not be used.

The regeneration air heat exchanger 386 may be angled so that a bottom portion is moved toward the outlet 318, while an upper portion is moved toward the regeneration air side 342 of the energy recovery module 340. In this manner, ice that melts during a defrosting process does not pool into a lower portion of the regeneration air heat exchanger 386 and/or a retaining pan and/or downstream side of the regeneration air heat exchanger 386. Instead, the melted run-off may be directed to an upstream side of the regeneration air heat exchanger 386 and/or to a drain. As such, the melted run-off does not freeze.

A fan 390 may also be positioned within the regeneration air channel 304. The fan 390 is configured to move the regeneration air 320 through the regeneration air channel 304. The fan 390 may be positioned anywhere within the regeneration air channel 304. Alternatively, the system 300 may not include the fan 390.

An outlet damper 392 may be positioned proximate to the outlet 318. The outlet damper 392 may be selectively actuated between open and closed positions in order to selectively allow and prevent exhaust air 322 from being vented to the atmosphere.

The system 300 may also include a condenser coil 394 within an air channel 396. A damper 397 may be positioned proximate to an air inlet 393. The damper 397 may be selectively operated to allow and prevent air from passing through the condenser 394. A condenser fan 398 may be used to move air through the air channel 396.

Additionally, a damper 391 may be disposed in a partition that separates the supply air channel 302 from the regeneration air channel 304. The damper 391 may be positioned downstream from the regeneration air heat exchanger 386 with respect to the regeneration air channel 304. The damper 391 may be opened to allow the exhaust air 322 to be mixed with the air 312 within the supply air channel 302. Alternatively, the system 300 may not include the damper 391. Also, alternatively, the damper 391 may be opened while both the outlet damper 392 and the outside air damper 330 are closed to allow the exhaust air 322 to be channeled directly to the supply air side 344.

Figure 4:
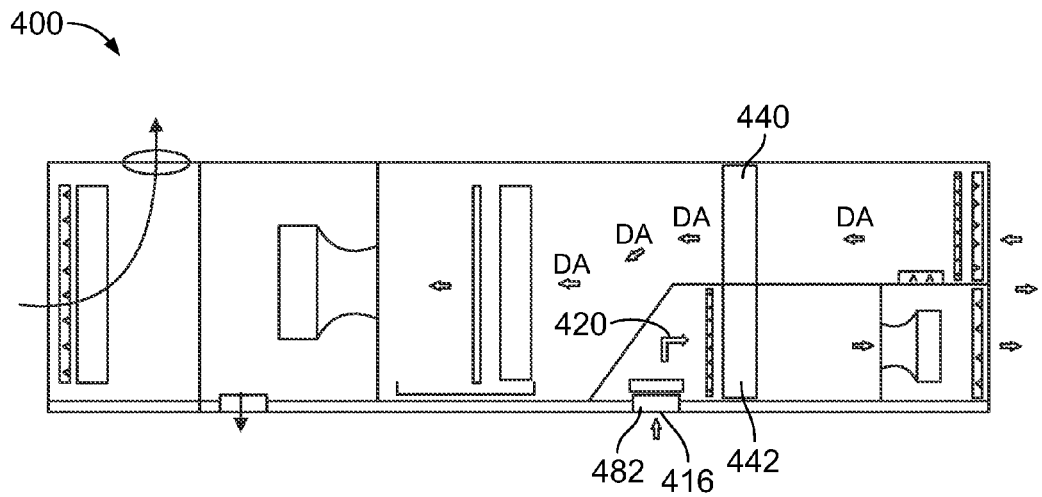
FIG. 4 illustrates a schematic diagram of a heat pump system, according to an embodiment of the present disclosure.

FIG. 4 illustrates a schematic diagram of a heat pump system 400, according to an embodiment of the present disclosure. The system 400 is similar to the system 300, except that the system 400 is shown without a regeneration air heat exchanger. A heater 482 may be located at or proximate to an air inlet 416 upstream from a regeneration air side 442 of an energy recovery device 440. The heater 482 may be used to heat the regeneration air 420 before it encounters the energy recovery device 440. As such, the energy recovery device 440 may be less susceptible to frost accumulation because the heater 482 may heat the regeneration air 420 to a temperature that exceeds the freezing point, for example.

Figure 5:
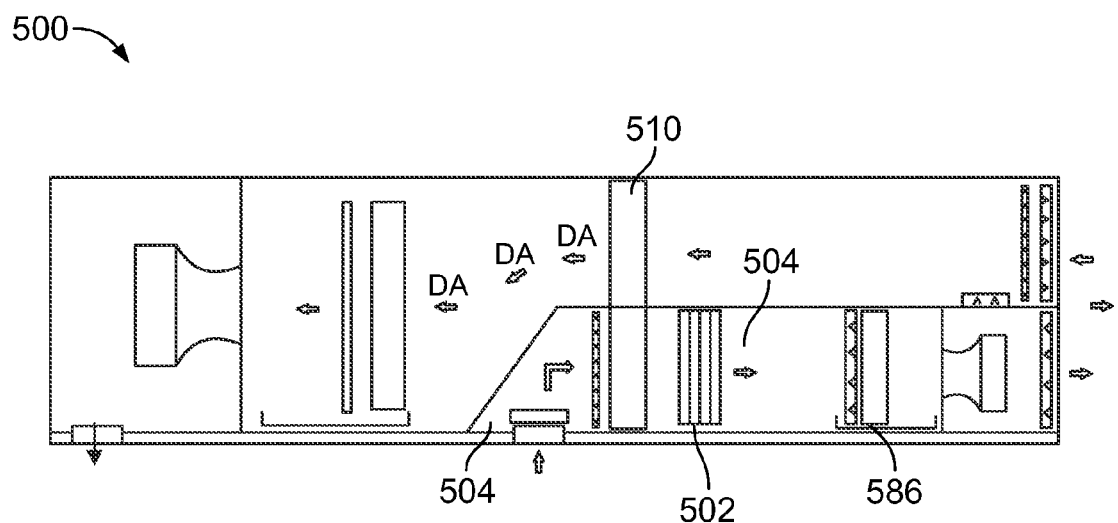
FIG. 5 illustrates a schematic diagram of a heat pump system, according to an embodiment of the present disclosure.

FIG. 5 illustrates a schematic diagram of a heat pump system 500, according to an embodiment of the present disclosure. The system 500 is similar to the system 300, except that the system 500 is shown without a condenser coil 394 within an air channel 396. Further, an additional damper 502 may be disposed between an energy recovery module 540 and a regeneration air heat exchanger 586 within the regeneration air channel 504. The damper 502 is configured to be opened to allow outside air into the regeneration air channel 504. When the damper 502 is closed, air from the outside is prevented from entering the regeneration air channel 504. The regeneration air heat exchanger 586 and a proximate damper 584 may be in an upright position. Optionally, the regeneration air heat exchanger 586 and the damper 584 may be angled, as shown and described with respect to FIG. 3, so that melt water does not pool at a downstream side of the regeneration air heat exchanger 586.

Figure 6:
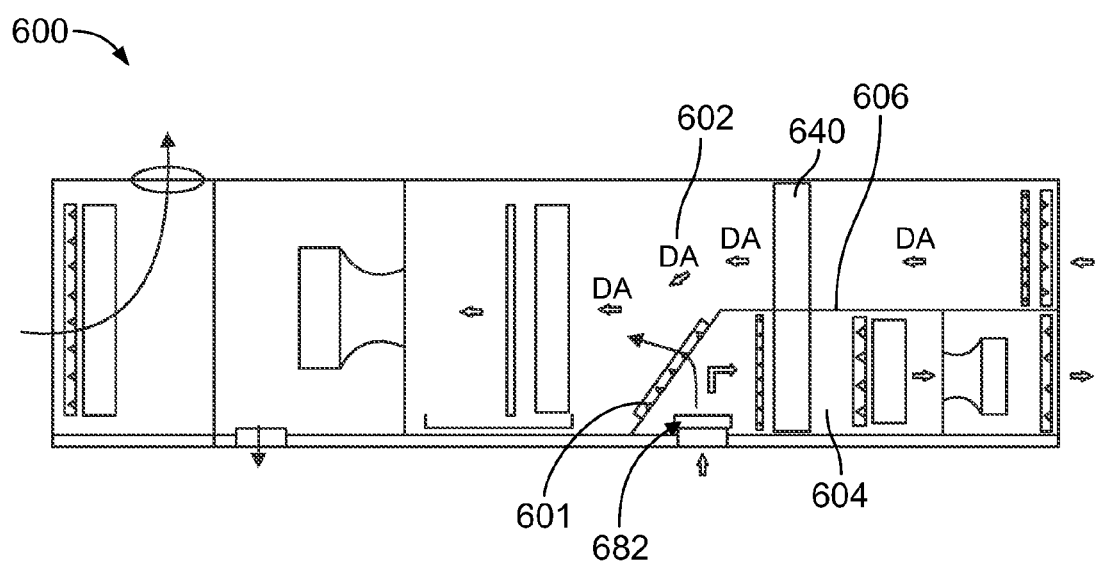
FIG. 6 illustrates a schematic diagram of a heat pump system, according to an embodiment of the present disclosure.

FIG. 6 illustrates a schematic diagram of a heat pump system 600, according to an embodiment of the present disclosure. The system 600 is similar to the system 300, except that a damper 601 is positioned within the partition 606. The damper 601 may be opened to allow regeneration or return air to be mixed with the supply air. The damper 601 may be positioned downstream from a heater 682 and upstream from an energy recovery device 640 in relation to the regeneration air channel 604. As such, when the damper 601 is opened, a portion of regeneration air 604 that passes through the heater 682 may mix with air within the supply air channel 602 at a point downstream from the energy recovery device 640 and upstream from a supply air heat exchanger 660.

Figure 7:
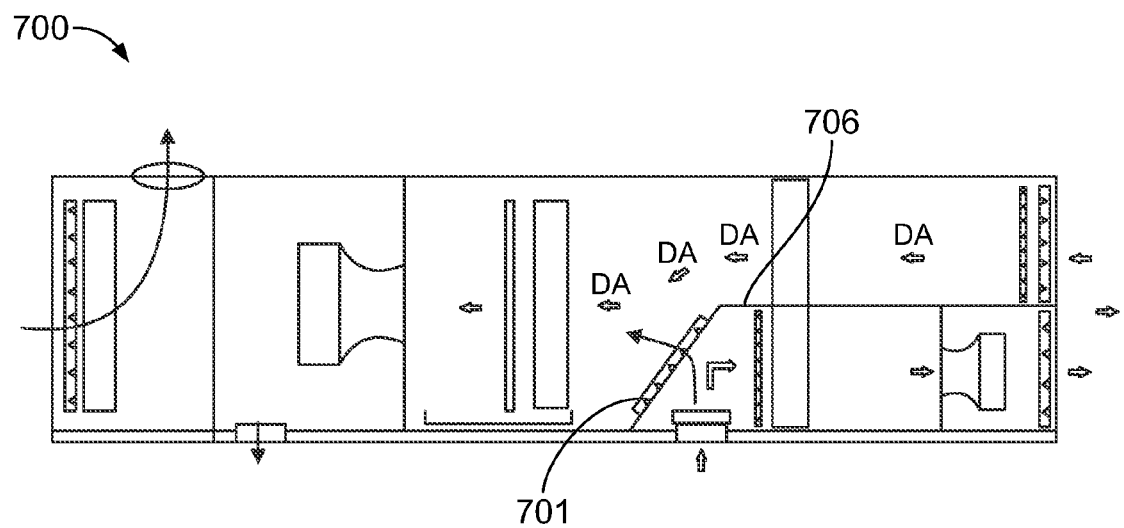
FIG. 7 illustrates a schematic diagram of a heat pump system, according to an embodiment of the present disclosure.

FIG. 7 illustrates a schematic diagram of a heat pump system 700, according to an embodiment of the present disclosure. The system 700 is similar to the system 400, except that that a damper 701 is positioned within the partition 706 proximate to the heater 782 (such as shown in FIG. 6). The damper 702 may be opened to allow regeneration or return air to be mixed with the supply air.

Figure 8:
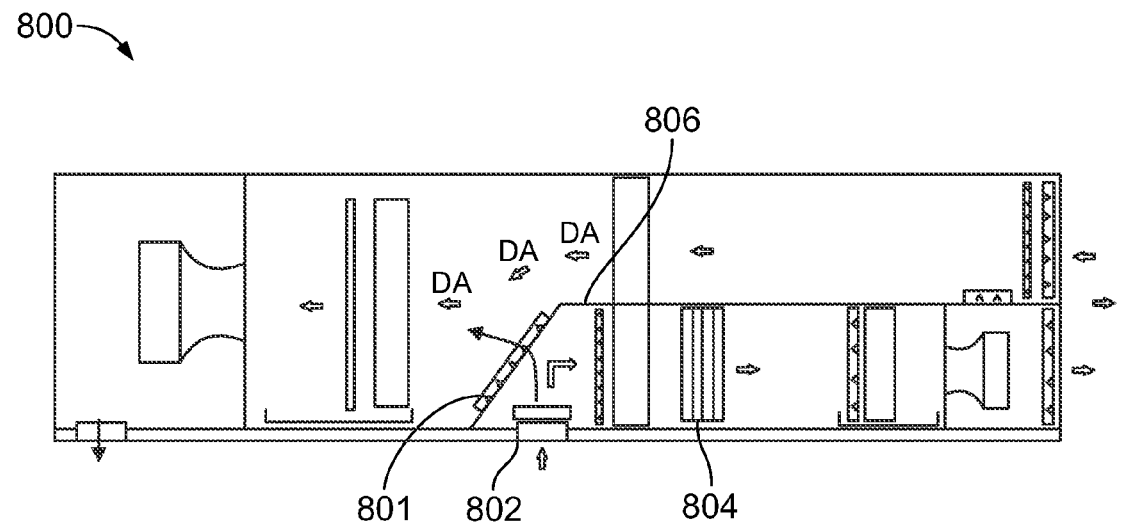
FIG. 8 illustrates a schematic diagram of a heat pump system, according to an embodiment of the present disclosure.

FIG. 8 illustrates a schematic diagram of a heat pump system 800, according to an embodiment of the present disclosure. The system 800 is similar to the system 500 of FIG. 5, except that that a damper 801 is positioned within the partition 806 proximate to the heater 882. The damper 801 may be opened to allow regeneration or return air to be mixed with the supply air.

Figure 9:
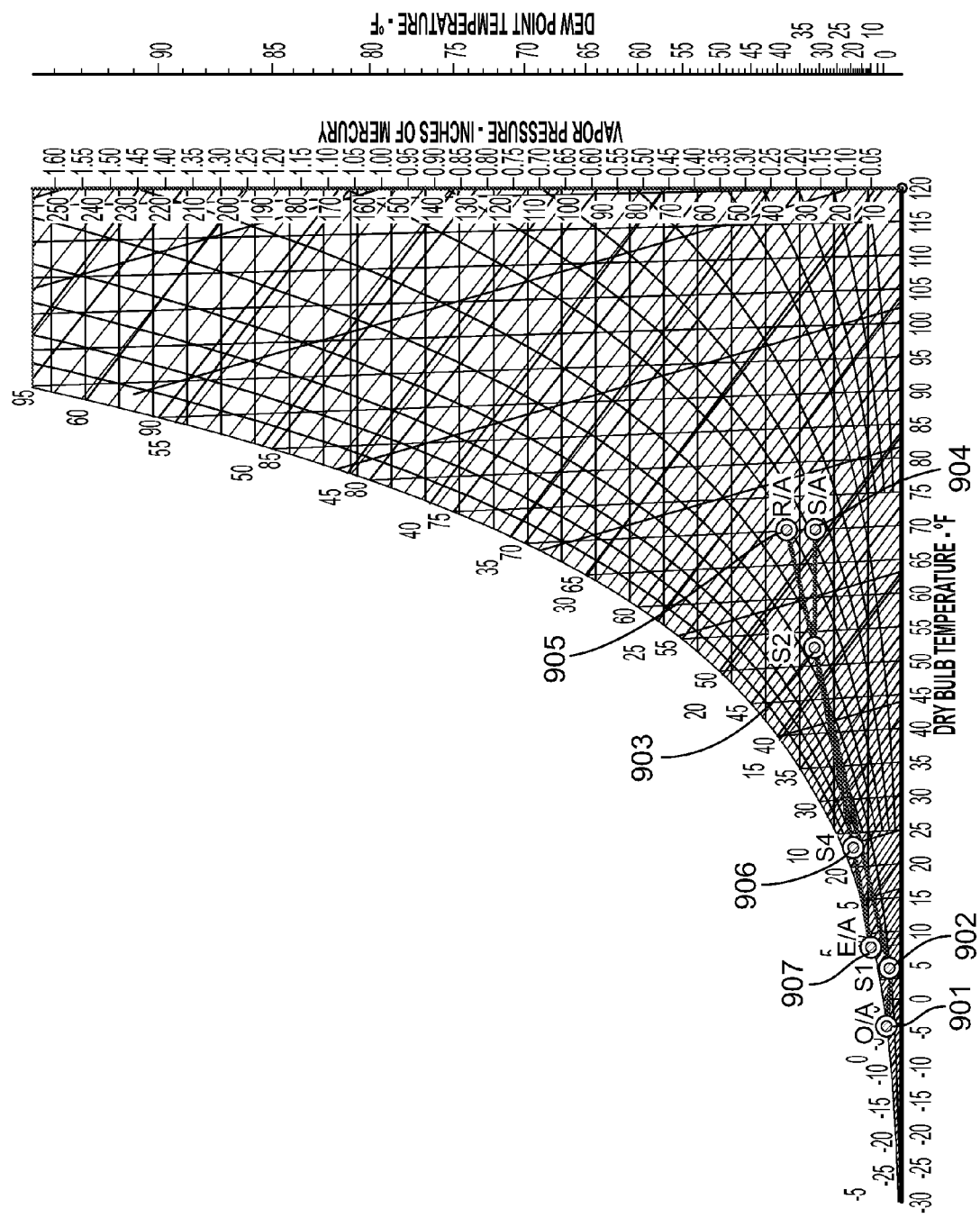
FIG. 9 illustrates a psychrometric chart of supply and regeneration air streams of a heat pump system operating in a winter mode, according to an embodiment of the present disclosure.

FIG. 9 illustrates a psychrometric chart of supply and regeneration air streams of a heat pump system operating in a winter mode, according to an embodiment of the present disclosure. The heat pump system may include an electric pre-heater in the supply air stream. Ambient air is drawn in the heat pump system at 901. The ambient air is heated through the pre-heater prior to entering an energy exchange module. Supply air is heated and humidified by the energy exchange module and the supply air conditions exiting the device are represented at 903. Air then enters a supply air heat exchanger and exits at 904. Regeneration air or return air from the enclosure enters heat pump at 905. Air is then conditioned by the energy exchange module and exits cooled and dehumidified at 906. Air then enters the regeneration air heat exchanger positioned within regeneration air channel downstream from the regeneration air side of the energy recovery module. Air exits the regeneration air heat exchanger at 907.

Figure 10:
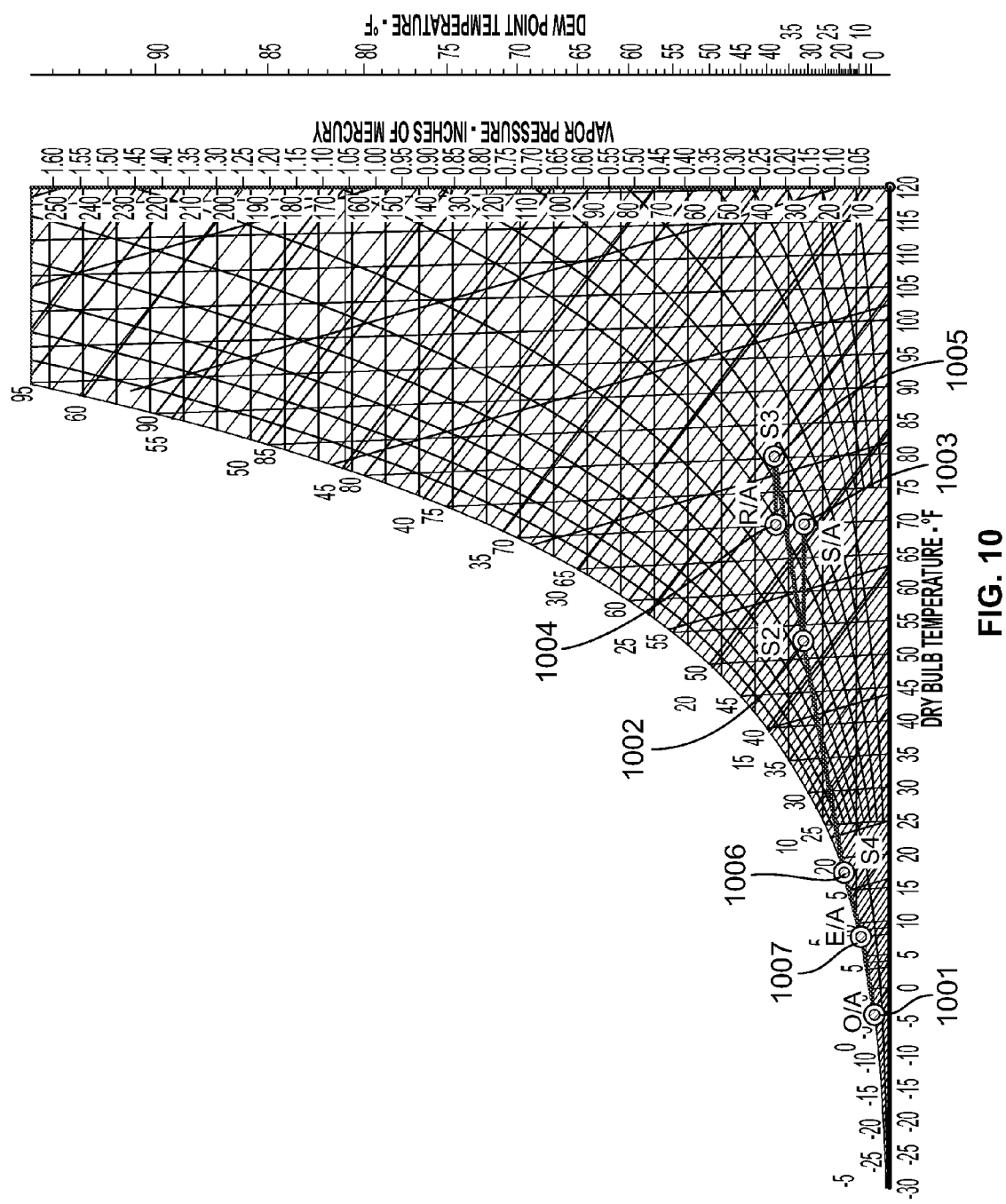
FIG. 10 illustrates a psychrometric chart of supply and regeneration air streams of a heat pump system operating in a winter mode, according to an embodiment of the present disclosure.

FIG. 10 illustrates a psychrometric chart of supply and regeneration air streams of a heat pump system operating in a winter mode, according to an embodiment of the present disclosure. Ambient air is drawn in the heat pump system at 1001. The supply air is heated and humidified by an energy exchange module and the supply air exits at 1002. Air then enters supply air heat exchanger and exits at 1003. Regeneration air or return air from the enclosure enters the heat pump at 1004. The air is then heated through a pre-heater prior to entering the energy exchange module at 1005. Air is then conditioned by the energy exchange module and exits cooled and dehumidified at 1006. Air then enters the regeneration air heat exchanger positioned within the regeneration air channel downstream from the regeneration air side of the energy recovery module. Air exits the regeneration air heat exchanger at 1007.

Figure 11:
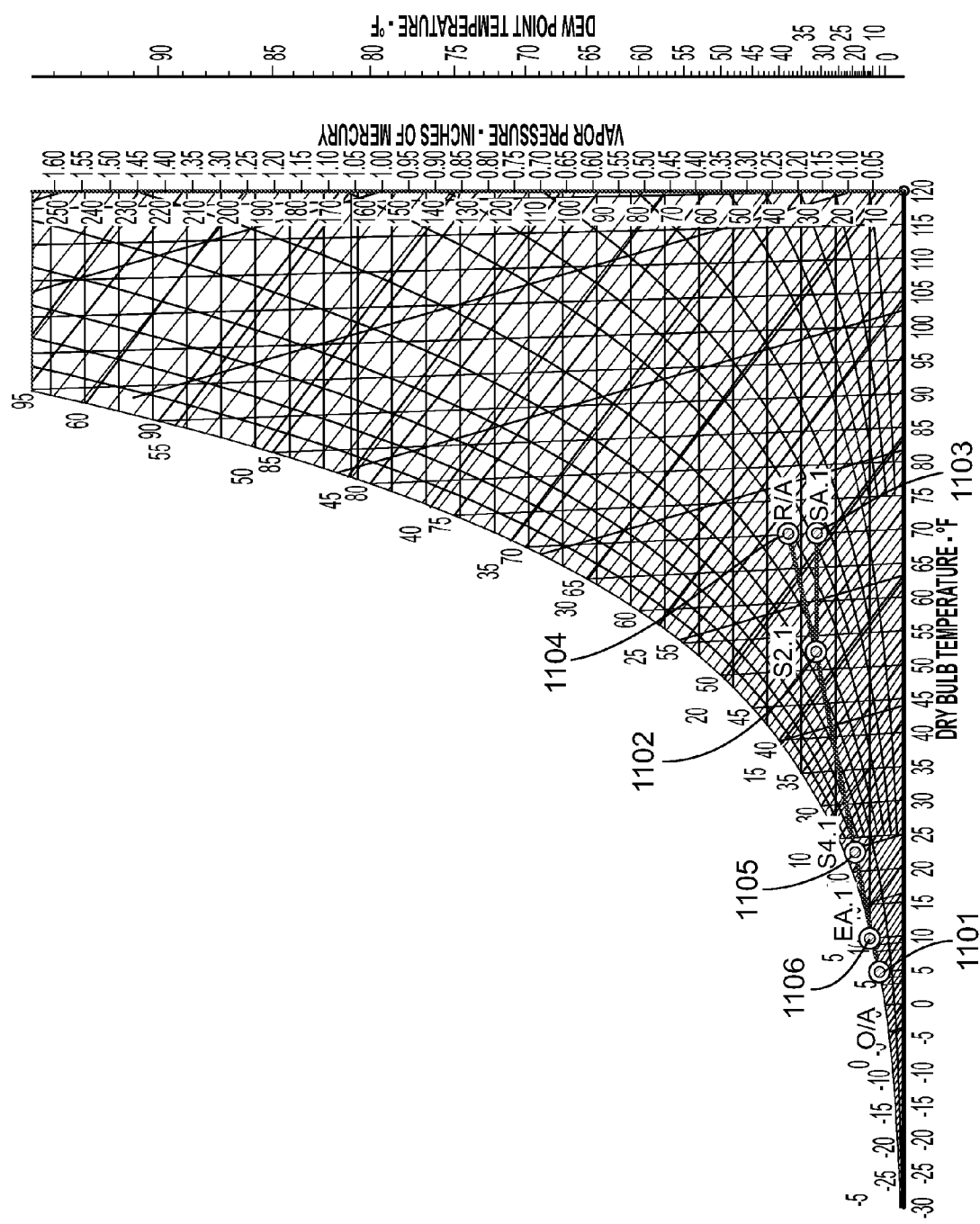
FIG. 11 illustrates a psychrometric chart of supply and regeneration air streams of a heat pump system operating in a winter mode, according to an embodiment of the present disclosure.

FIG. 11 illustrates a psychrometric chart of supply and regeneration air streams of a heat pump system operating in a winter mode, according to an embodiment of the present disclosure. In this embodiment, an energy recovery module may operate at maximum effectiveness. Ambient air is drawn in the heat pump system at 1101. The supply air is heated and humidified by the energy exchange module and the supply air exits the device at 1102. Air then enters supply air heat exchanger and exits at 1103. Regeneration air or return air from the enclosure enters the heat pump at 1104. Air is then conditioned by the energy exchange module and exits cooled and dehumidified at 1105. Air then enters the regeneration air heat exchanger positioned within regeneration air channel downstream from the regeneration air side of the energy recovery module. Air exits the regeneration air heat exchanger at 1106.

Figure 12:
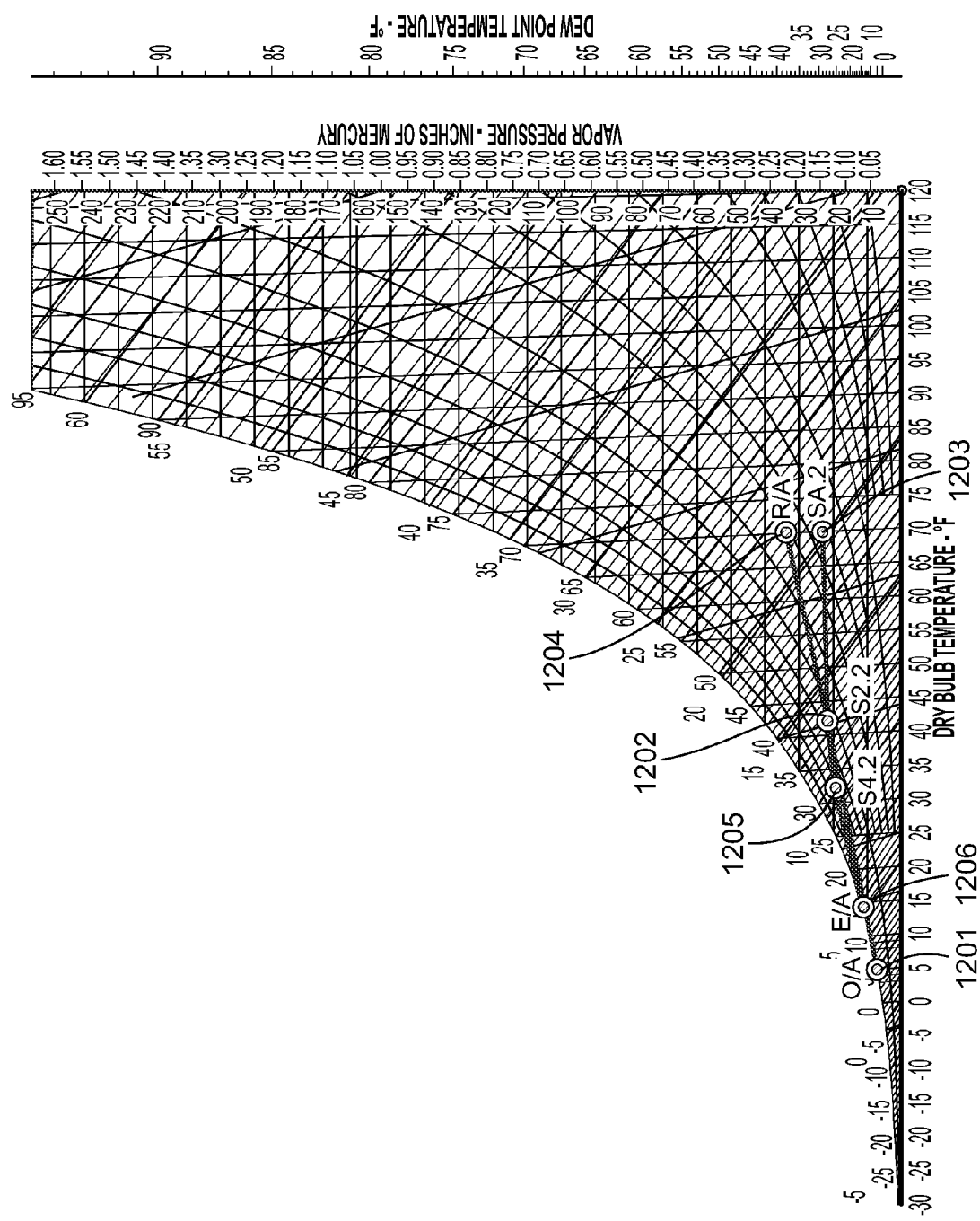
FIG. 12 illustrates a psychrometric chart of supply and regeneration air streams of a heat pump system operating in a winter mode, according to an embodiment of the present disclosure.

FIG. 12 illustrates a psychrometric chart of supply and regeneration air streams of a heat pump system operating in a winter mode, according to an embodiment of the present disclosure. In this embodiment, an energy recovery module may operate at a reduced effectiveness. Ambient air is drawn in the heat pump system at 1201. The supply air is heated and humidified by the energy exchange module and the supply air exits the device at 1202. Air then enters a supply air heat exchanger and exits at 1203. Regeneration air or return air from the enclosure enters the heat pump at 1204. Air is then conditioned by the energy exchange module and exits cooled and dehumidified at 1205. Air then enters the regeneration air heat exchanger positioned within the regeneration air channel downstream from the regeneration air side of the energy recovery module. Air exits the regeneration air heat exchanger at 1206.

Figure 13:
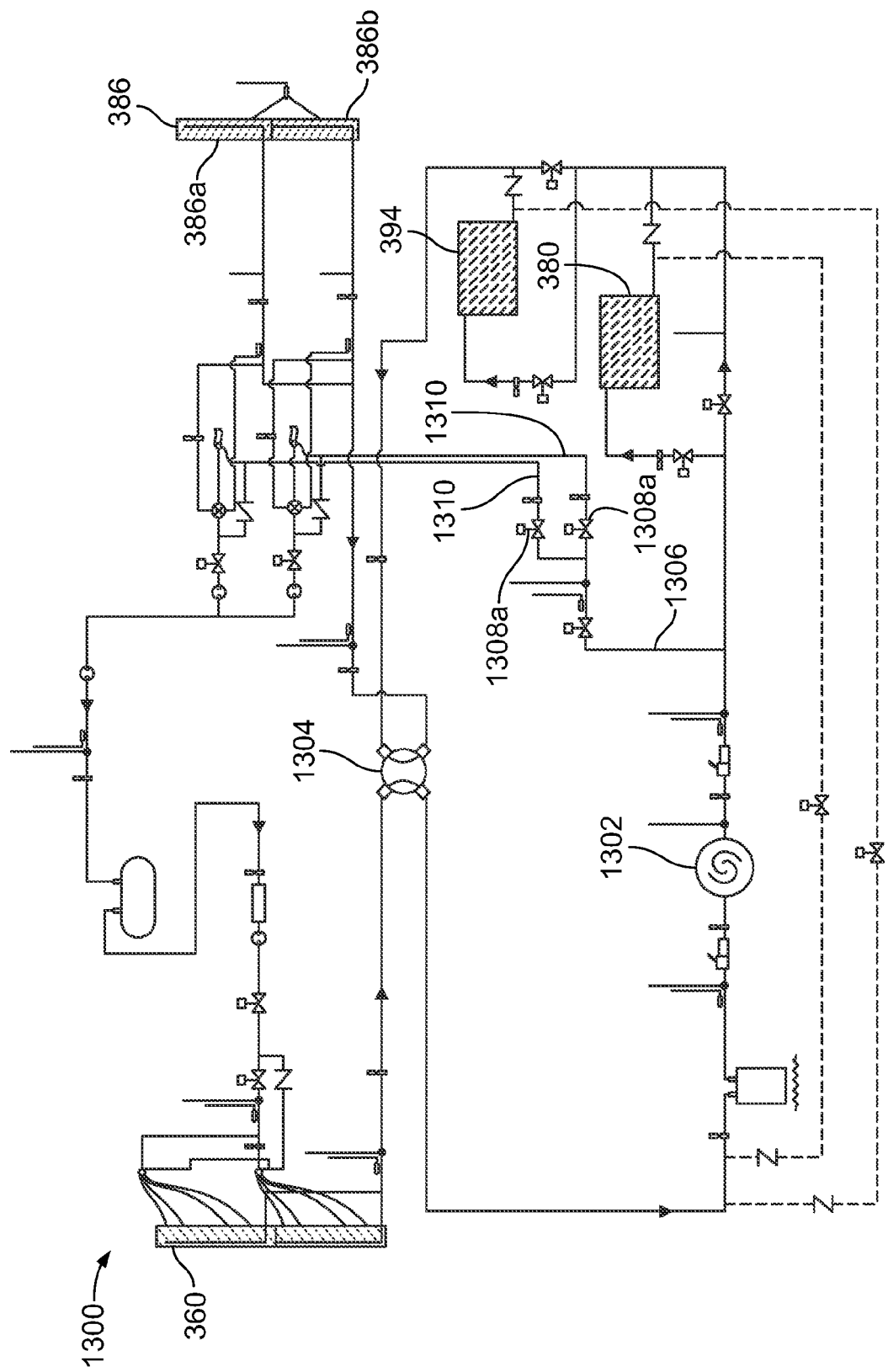
FIG. 13 illustrates a schematic diagram of a refrigerant system, according to an embodiment of the present disclosure.

FIG. 13 illustrates a schematic diagram of a refrigerant system 1300, according to an embodiment of the present disclosure. In particular, FIG. 13 illustrates a piping schematic of the refrigerant system 1300. The refrigerant system 1300 may be used with the system 300 shown and described with respect to FIG. 3. Alternatively, the refrigerant system 1300 may be used with any of the embodiments described above. However, the refrigerant system 1300 will be described in conjunction with FIG. 3.

Referring to FIGS. 3 and 13, a compressor 1302 is in fluid communication with the hot gas reheat coil 380, the regeneration air heat exchanger 386, the condenser coil 394, and the supply air heat exchanger 360 through various refrigerant piping, conduits, valves, and the like. As such, the hot gas reheat coil 380, the regeneration air heat exchanger 386, the condenser coil 394, and the supply air heat exchanger 360 may all be fluidly connected together so that refrigerant may circulate therebetween.

The regeneration air heat exchanger 386 may include coil sub-sections 386a and 386b. Alternatively, the regeneration air heat exchanger 386 may include more or less sub-sections.

Refrigerant may pass from a compressor 1302 through one or more switches, temperature sensors, pressure transducers, valves, and the like toward one or more of the hot gas reheat coil 380, the regeneration air heat exchanger 386, the condenser coil 394, and the supply air heat exchanger 360, depending on whether certain valves are opened or closed. A four-way valve 1304 may be disposed within the refrigerant piping between the hot gas reheat coil 380, the regeneration air heat exchanger 386, the condenser coil 394, and the supply air heat exchanger 360.

In operation, during a defrost mode or cycle, which may simultaneously occur with a normal heating mode or cycle, hot refrigerant may be diverted to the regeneration air heat exchanger 386 by way of a bypass line 1306. A modulating valve may modulate an amount of hot refrigerant to the regeneration air heat exchanger 386. One or more solenoid valves 1308 may be disposed within lines that connect to the coil sub-sections 386a and 386b. The solenoid valves 1308 are used to selectively allow and prevent the hot refrigerant from passing into the coil sub-sections 386a and 386 in order to defrost the individual sub-sections. For example, if the solenoid valve 1308a is closed, hot refrigerant is prevented from passing to the coil sub-section 386a. As such, the coil sub-section 386a operates in a normal heating mode. When the solenoid valve 1308a is opened, hot refrigerant passes to the coil sub-section 386a, thereby defrosting the coil sub-section 386a. The solenoid valve 1308b operates in a similar fashion to selectively provide and prevent hot refrigerant to the coil sub-section 386b. Thus, when the solenoid valve 1308a is opened and the solenoid valve 1308b is closed, the coil sub-section 386a may be defrosted, while the coil sub-section 386b operates in a normal heating mode, and vice versa. As such, one section, portion, or area of the regeneration air heat exchanger 386 may be defrosted, while one or more other sections simultaneously operate in a normal heating mode. The coil sub-sections 386a and 386b may be sequentially defrosted, such that after one coil sub-section is defrosted, the other coil-subsection may be defrosted, and the process may repeat.

After the hot refrigerant passes through the regeneration air heat exchange 386, refrigerant is directed to the four way valve 1304 and may also be directed to the inlet side of the compressor 1302. Alternatively, the four way valve 1304 may be operated to divert the hot refrigerant toward the supply air heat exchanger 360, instead of the compressor 1302. While the defrosting process is described with respect to the regeneration air heat exchanger 386, the process described above may be used in connection with any of the hot gas heat recoil 380, the condenser coil 394, the regeneration air heat exchanger 386, and/or the supply air heat exchanger 360. For example, each of the other heat exchangers or coils may include similar lines and solenoid valves that allow hot refrigerant to be diverted thereto in a similar manner.

Figure 14:
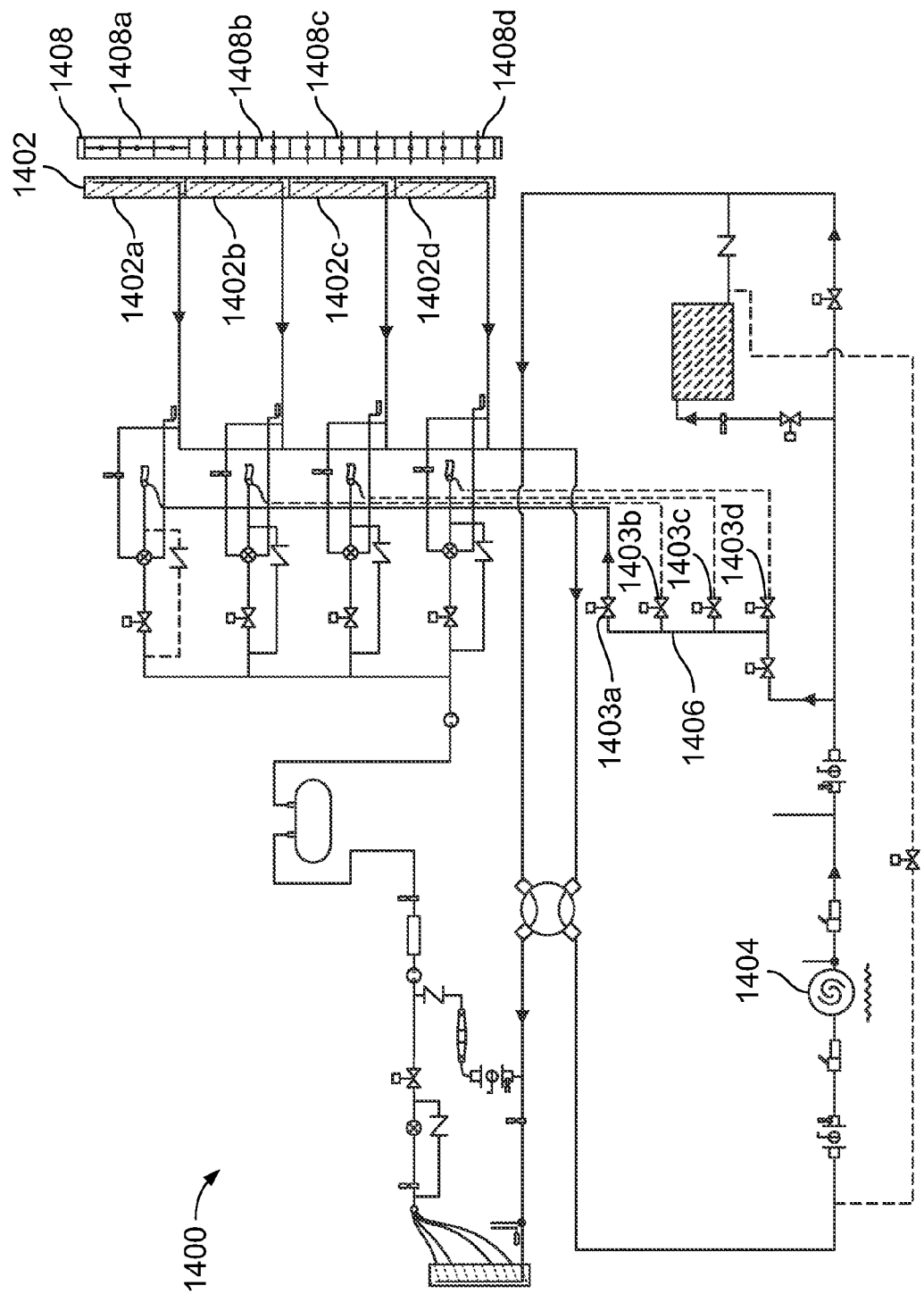
FIG. 14 illustrates a schematic diagram of a refrigerant system, according to an embodiment of the present disclosure.

FIG. 14 illustrates a schematic diagram of a refrigerant system 1400, according to an embodiment of the present disclosure. The refrigerant system 1400 may be used in connection with the system 300 of FIG. 3, or any of the other systems described above. For example, a heat exchanger 1402 includes four coil sub-sections 1402a, 1402b, 1042c, and 1402d connected to a compressor 1404 through a hot refrigerant bypass line 1406. Additionally, a damper 1408 may be positioned proximate to the heat exchanger 1402, and may include actuatable portions 1408a, 1408b, 1408c, and 1408d that align with respective coil sub-sections 1402a, 1402b, 1402c, and 1402d. Alternatively, the system 1400 may include more or less actuatable portions and more or less coil sub-sections.

In operation, in order to defrost the heat exchanger 1402, such as the regeneration air heat exchanger 386 shown in FIG. 3, the actuatable portion 1408a is closed, and a solenoid valve 1403a is opened (while the solenoid valves 1403b, 1403c, and 1403d are closed) so that hot refrigerant is bypassed to the coil sub-section 1402a. During this time, the other actuatable portions 1408b, 1408d, and 1408d are opened so that air may flow through the coil sub-sections 1402b, 1402c, 1402d, which do not receive hot refrigerant, but, instead, operate in a normal heating fashion. After the coil sub-section 1402a is defrosted, the actuatable portion 1408a is opened, valves are closed to prevent hot refrigerant from passing into the coil sub-section 1402a, and the coil sub-section 1402b receives hot refrigerant, while the actuatable portion 1408b is closed. The process repeats for each of the coil sub-sections. In this manner, the coil sub-sections 1402a-d may be sequentially defrosted. The sequential defrost mode may continually occur during normal heating operation of the system 1400. Alternatively, the sequential defrost may be selectively activated and deactivated.

Figure 15:
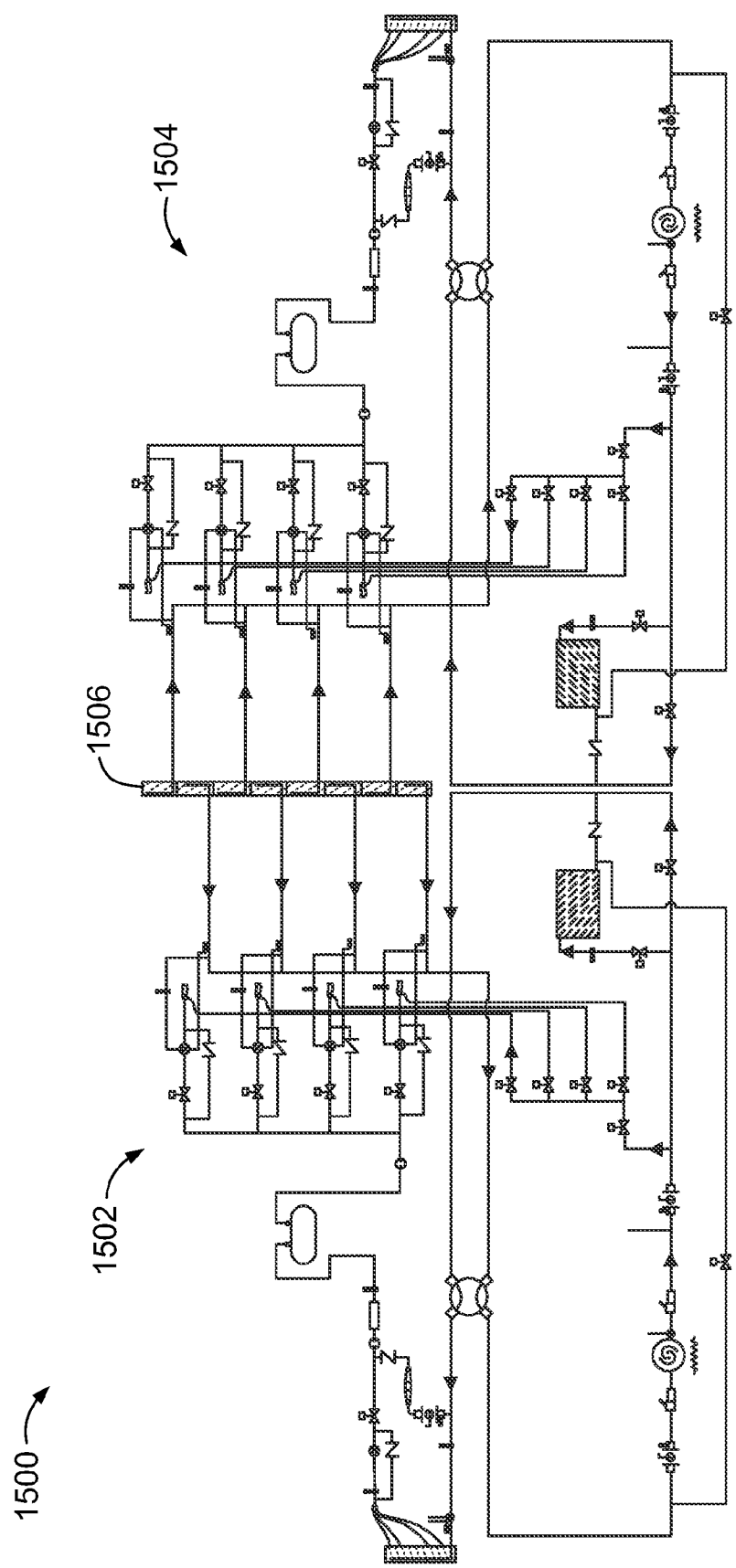
FIG. 15 illustrates a schematic diagram of a refrigerant system, according to an embodiment of the present disclosure.

FIG. 15 illustrates a schematic diagram of a refrigerant system 1500, according to an embodiment of the present disclosure. The system 1500 is similar to the systems 1300 and 1400. However, the system 1500 includes first and second refrigerant circuits 1502 and 1504 connected to a common heat exchanger 1506. The heat exchanger 1506 may or may not include a damper positioned on both sides. The heat exchanger 1506 may contain multiple sub-sections and may be sequentially defrosted as described above.

Referring to FIGS. 1-15, frost formation on a heat exchanger, evaporator, or condenser coil, such as that of a regeneration air heat exchanger, in an ASHP typically takes between one to five hours to form, depending on the temperature and humidity of the entering air. Accordingly, there is available and useful time for refrigerant to capture energy before defrosting the coils, thereby maximizing the time that energy is transferred to the refrigerant and can be used to heat the supply air stream (with the supply air heat exchanger).

In order to maximize the heat transfer from the regeneration air heat exchanger to the refrigerant, a fairly clean (that is, little to no frost accumulation) coil is used. Embodiments of the present disclosure provide systems and methods that allow continuous operation of the refrigeration system to capture energy from the regeneration air (or ambient air). The captured energy is transferred to the refrigerant and thus the supply air stream via the supply air heat exchanger.

The systems and methods may continually defrost separate and distinct sub-sections or portions of the regeneration air heat exchanger while the remainder and the majority of the regeneration air heat exchanger still captures energy from the regeneration air (or ambient air), and transfers the energy to the refrigerant. Hot refrigerant is used to directly and sequentially defrost portions of the regeneration air heat exchanger. Less refrigerant heat is lost to the regeneration air stream and exhausted to ambient. Repeated defrosting of the sub-sections of the regeneration air heat exchanger during continuous operation of the refrigeration system ensure that there may be no interruption of heated, conditioned, and/or ventilation air to the enclosure.

The systems and methods described increase and control the capacity of the compressor during hot gas defrost cycles to maintain the compressor(s) within safe operating ranges, maintain suction and discharge pressures relatively constant when in and out of defrost mode, and maintain leaving air temperature from the supply air heat exchanger relatively constant. When a variable speed compressor and variable frequency drive (VFD) are used, during the defrost cycle the compressor may be over-sped or overdriven to increase the mass flow rate of the refrigerant in the circuit. The additional capacity ensures that the suction temperature and pressure, as well as the supply air discharge temperature, remain relatively constant. It has been found that when a portion of the hot gases are diverted to defrost a portion of the heat exchanger, such as the regeneration air heat exchanger, the overall circuit suction pressure increases. By briefly increasing the suction pressure, the remainder of the regeneration/condenser coil heat source and ability to absorb additional heat may decrease as the refrigerant conditions during defrost have changed (suction and discharge pressure) prior to the defrost cycle being initiated.

In a system that includes both an energy exchange module and a regeneration air heat exchanger that share and utilize the same regeneration/return air as the heat source, both the energy exchange module and the regeneration air heat exchanger may be prone to frosting and defrosted as described in the present disclosure. In a system that includes ambient air heat exchangers as a heat source, the following parameters may be controlled: air flow volumes over coils, multiple independent refrigeration circuits in a lead/lag fashion, using ambient air to defrost coil in unused circuits, and utilizing direct sun light or reflective surfaces.

Each system may include either multiple face split air heat exchanger or a single air heat exchanger with multiple sub-sections. Each split face air heat exchanger refrigeration circuit or sub-section may be isolated from others with solenoid valves. Individual heat exchanger sub-sections may be operated as an evaporator (for example, capturing heat from the regeneration air or the ambient air and transferring the heat to the refrigerant), while other individual sub-sections may be operated as a condenser (for example, providing heat to the condenser coil surface) in order to melt the ice that has accumulated on the heat exchanger surface/fins.

Because each sub-section may be isolated from other sub-sections, the refrigeration system may be continuously operated to capture energy from the regeneration air (or ambient air) and transfer the energy to the refrigerant. Further, continuously defrosting distinct sub-sections or portions of the heat exchanger while the remainder and the majority of the sub-sections still capture energy from the regeneration air (or the ambient air) provides additional energy to the overall refrigeration system, ensuring that the coils remain clean or otherwise significantly frost free. As such, the systems may operate in steady and continuous operation at low ambient temperatures.

When a portion of the refrigerant hot gases are diverted to defrost a portion of the condenser coil or sub-section of the regeneration air heat exchanger, for example, there may be less hot refrigerant available to heat the supply air stream with the supply air heat exchanger, thereby reducing the supply air temperature to the enclosure. As such, a larger capacity compressor, or a tandem type compressor may be used. The larger compressor may be run at its maximum nameplate capacity, or a second tandem compressor may be used during the defrost cycle. While over-speeding the compressor from a design operating frequency of 70 Hz to 90 Hz while in defrost, suction pressure, discharge pressure, and the like remain within acceptable parameters of the compressor. Indeed, while over-speeding or overdriving the compressor during defrost, the suction and discharge pressure remain fairly constant to the value prior to the defrost mode. Because the defrost cycles may be short, the compressor may operate in higher ranges (either above the mean operation speed when not in defrost and/or higher than what the compressor manufacturer recommends), such as, for example, between 90-120 Hz and above. As such, the compressor may operate above compressor manufacturer typical recommendations during defrost cycles.

Embodiments of the present disclosure also provide systems and methods that divert a portion of the hot gas to an air heat exchanger or sub-section and then re-direct the refrigerant back in the common line either at the suction line, discharge or the liquid line. An alternative approach is to utilize independent refrigeration circuits. The air heat exchanger may be located in the regeneration air stream (in the return air from the enclosure) or ambient.

When air heat exchangers are located in ambient airstreams, the air flow across the coils may be controlled independently from the return or supply air and thus not negatively impact building pressurization. As air flow across the condenser coils increases, the amount of energy available to be transferred to the refrigerant, and thus to heat the supply air, increases.

Because compressor and system capacity may be typically sized for the cooling season, additional heating stages can be frequent in the heating season. With control enhancements (such as coils being exposed to direct sun light or reflective surfaces, refrigeration circuits operating in lead/lag, and the like) overall system performance may be improved. As an example, if an ASHP system has 4 individual refrigeration circuits and only two circuits are required to heat the supply air to the desired conditions, ambient air that is near or above freezing may be drawn through the coils that are not in service and are defrosted without the traditional complete reverse cycle refrigerant defrost. The two unused circuits may have sufficient time to defrost with ambient air until the two operating coils freeze-up. Once the two operating coils are frozen and require defrost, the control logic switches the lead and the lag compressors. Control logic measures cycle time and determines when a hot gas or reverse cycle defrost is required.

In a rooftop HVAC system, for example, the entering air to the supply heat exchanger may be above 65° F. As such, little to no heating or temperature rise across the supply air heat exchanger is needed. Because typical rooftop refrigeration circuits are sized for the summer, in winter, additional capacity may be available. Instead of operating one circuit at a time (as an example in a 4 independent circuit system as previously described above), all the circuits (assuming each circuit includes its own modulating capacity compressor) may be operated at minimum capacity. For example, each circuit may provide 10° F. temperature rise at full capacity for a total of 40° F. and only 10° F. temperature rise is needed across the supply coil in order to satisfy the heating load. One option is to run only one compressor at 100% for 10° F. to raise the temperature. Another option is to run all 4 compressors at 25% of either maximum capacity, resulting in a 2.5° F. rise per circuit×4 circuits=10° F. total temperature rise across the supply air coil. In such an operation, each circuit operates at a higher suction temperature and increases effective operation time between defrost cycles. Further, depending on the entering air temperatures to the regeneration/ambient coil with the later mode of operation, the defrost cycle may not be required.

In a system that includes both an energy exchange module and a regeneration/condenser coil/air heat exchanger (in an ASHP) that share and utilize the same regeneration/return air as the heat source, the energy exchange module and the regeneration air heat exchanger/condenser coil may both be prone to frosting and need to be defrosted. In at least one embodiment, electric pre-heat frost prevention may be used in connection with an energy recovery module. The objective of the pre-heater is to raise the temperature of the return air so that the exhaust air is above a certain set point of either a dry bulb temperature or below a certain humidity. By controlling the quantity of pre-heat, frost formation on the energy recovery module and/or the regeneration air heat exchanger may be avoided, reduced, and/or minimized. The additional heat that is added to the system by the pre-heater represents additional heat that may be utilized by the regeneration/condenser air heat exchanger and thus the refrigeration system to heat the supply air as both the energy exchanger module and regeneration air heat exchanger share the air stream/heat source. Alternatively, the pre-heater may heat the outside supply air stream, thereby further reducing the risk of frost formation on the energy recovery module and/or the regeneration air heat exchanger. With the ability to reduce the moisture content in the common heat source (return/regeneration air stream), the moisture content of the air entering the regeneration air heat exchanger is reduced, thereby reducing frost build-up on the regeneration heat exchanger.

Because the energy exchange module transfers both moisture and temperature between both air streams, an increase in return air temperature (due to the operation of the pre-heat) provides additional energy to the supply air stream. Thus, the supply air entering the supply air heat exchanger is at a higher temperature, thereby increasing the refrigerant head pressure, which in turns increases the ability for the refrigeration system to operate and reject additional heat, and furthermore reduces the load requirements on the supply heat exchanger, thereby lowering the overall effort required by the heat pump system.

With a variable frequency drive (VFD) defrost strategy and a decrease in a rotational speed on the energy recovery module, the effectiveness of the energy recovery module to transfer heat and moisture may be reduced. Lower speed may result in increased effectiveness with respect to the regeneration heat exchanger, but decreased effectiveness with respect to the supply heat exchanger.

As both the energy exchange module and the heat exchangers in the heat pump system may utilize the same building air as a common heat source, and the energy exchange module performance influences the moisture content of the common source air, the controls of both the energy exchange module and heat pump system may be optimized to increase overall system efficiency.

Utilizing regeneration air heat exchanger sub-sections with a vertical tube pattern may provide significant defrosting advantages. For example, during a sub-section defrost, the entire coil section height may be defrosted so water shedding will be top to bottom and directly into a drain pan.

Additionally, a plurality of dampers may be positioned upstream of the regeneration air heat exchanger. As a sub-section of the regeneration air heat exchanger is defrosted, the upstream damper may be closed, which significantly speeds up the ice melt and reduce heat loss to the regeneration air stream.

Figure 16:
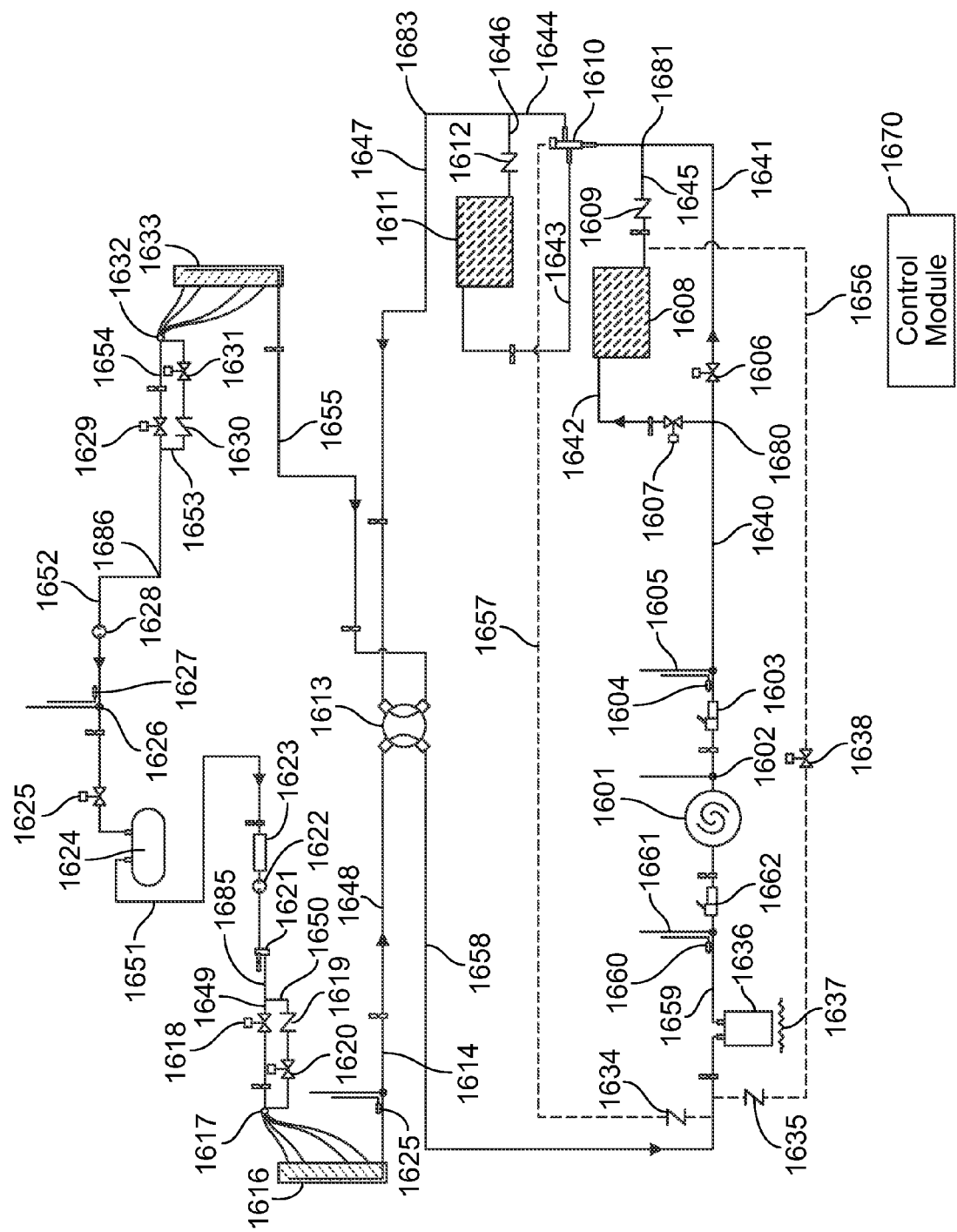
FIG. 16 illustrates a schematic diagram of a refrigerant system, according to an embodiment of the present disclosure.

FIG. 16 illustrates a schematic diagram of a refrigerant system 1600, according to an embodiment of the present disclosure. The refrigeration system 1600 may be in fluid communication with a heat pump system, such as a heat pump system 300 shown in FIG. 3. In at least one embodiment, in the heating mode, a compressor 1601 may condition refrigerant flowing between a supply air heat exchanger 1616 and a regeneration air heat exchanger 1633. The heated air from the supply air heat exchanger 1616 is discharged into the conditioned space or enclosure. The cooled air from the regeneration air heat exchanger 1633 is discharged into the outside air or ambient. The refrigerant system 1600 includes a node branch 1680 located downstream, along the fluid flow path, from the compressor 1601. At the node branch 1680, the fluid path continues along refrigerant branch 1641. The refrigerant branch 1641 extends to and from the compressor 1601 and the valve 1610. Valves 1606, 1607 and 1610 are located along the branches 1641, 1642 and 1643, respectively, to permit and inhibit flow of the fluid refrigerant through of the branches 1641, 1642 and/or 1643. The outlets of the valves 1606 and 1607 merge again at node 1681 whereas valve 1610 can divert refrigerant flow to either branch 1643 or 1644. It is also to be understood that valve 1610 can be partially open or partially closed and could diverge refrigerant flow in both branches 1643 and 1644. The valves 1606, 1607 and 1610 may be automatically controlled by a control module 1670, such as a computing device, circuitry, logic, integrated chip, and/or the like. The valves 1606, 1607 and 1610 may be adjusted between fully open, fully closed, partially open, and partially closed positions to vary the amount of fluid refrigerant that flows along each of the branches 1641, 1642, 1643 and 1644. The valves 1606, 1607 and 1610 may be adjusted based upon summer versus winter mode.

The refrigerant system 1600 includes a switching device 1613 that is connected to node 1683 with branch 1647. In the winter mode the switching device 1613 is operated such that branch 1647 and branch 1648 are fluidly connected together and branch 1655 and branch 1658 are fluidly connected together. In the summer mode the switching device 1613 is operated such that branch 1647 and branch 1655 are fluidly connected together and branch 1648 and branch 1658 are fluidly connected together.

In the winter mode hot fluid refrigerant flows from branch 1647 through switching device 1613 to the supply air heat exchanger 1616 via branch 1648. The hot refrigerant is utilized to heat the supply air stream. The supply air heat exchanger 1616 is connected to a refrigeration distribution device 1617. An electronic flow metering device 1618 is located along the branch 1649, whereas a valve and flow direction control valves 1620 and 1619 are located along the branch 1650. Electronic flow metering device 1618 and valves 1620 and 1619 permit and inhibit flow of the fluid refrigerant through the branches 1649 and 1650. The outlets of the valves 1618 and 1619 merge again at node 1685. The valves 1618 and 1620 may be automatically controlled by the controller module 1670. The valves 1618 and 1620 may be adjusted between fully open, fully closed, partially open, and partially closed positions to vary the amount of fluid refrigerant that flows along each of the branches 1649 and 1650. Refrigerant flow in branches 1649 and 1650 may be adjusted based upon summer versus winter mode. In another embodiment, in the winter mode, the valve 1620 may be closed by the control module 1670 and the electronic flow metering device 1618 may be partially closed to allow liquid refrigerant to accumulate in the supply air heat exchanger 1616, thereby reducing the effective surface area of the supply air heat exchanger 1616, and increasing the refrigeration system 1600 head pressure. Increasing head pressure increases compressor 1601 power consumption and increases the heat of rejection in the supply air heat exchanger 1616, thereby increasing further the temperature of the supply air that is discharged into the conditioned space or enclosure. Depending on the various supply, regeneration, and ambient air temperatures as well as the refrigeration suction, discharge temperatures and pressures, the control module 1670 may control the electronic flow metering device 1618 and the compressor 1601 to optimize heating efficiency, coefficient of performance, and the like while maintaining proper supply air conditions at various ambient and load conditions.

At the node branch 1685, the fluid path continues along refrigerant branch 1651. The refrigerant branch 1651 and 1652 extends to and from the nodes 1685 and 1686. Various valves, dyers, view ports, refrigerant accumulator, temperature and pressure sensors may be located along the branches 1651 and 1652 to ensure proper refrigerant management and quality, and provide the control module 1670 with various sensed conditions.

A regeneration air heat exchanger 1633 is connected to a refrigeration distribution device 1632. The regeneration air heat exchanger 1633 may also be connected to the switching device 1613 via branch 1655. An electronic flow metering device 1629 is located along the branch 1654, while a valve and flow direction control valve 1631 and 1630 respectively are located along the branch 1653. Electronic flow metering device 1629 and valves 1631 and 1630 permit and inhibit flow of the fluid refrigerant through the branches 1654 and 1653. The valves 1630 and 1631 may be automatically controlled by the controller module 1670. The valves 1630 and 1631 may be adjusted between fully open, fully closed, partially open and partially closed positions to vary the amount of fluid refrigerant that flows along each of the branches 1654 and 1653. Refrigerant flow in branches 1654 and 1653 may be adjusted based upon summer and winter modes of operation. In at least one other embodiment, in the summer mode, valve 1631 is closed by the control module 1670 and the electronic flow metering device 1629 is partially closed to allow liquid refrigerant to accumulate in the regeneration air heat exchanger 1633, thereby reducing the effective surface area of the regeneration air heat exchanger 1633 and increasing the refrigeration system 1600 head pressure. Increasing head pressure in the cooling mode under low ambient conditions may allow the compressor 1601 to operate in a proper operating range, provide adequate compressor ratio, and allow the supply air heat exchanger 1616 to properly condition the supply air to the space. Depending on the various supply, regeneration, and ambient air temperatures as well as the refrigeration suction, discharge temperatures and pressures, the control module 1670 may control the electronic flow metering device 1629 and the compressor 1601 to optimize cooling/heating efficiency, coefficient of performance, and energy efficiency ratio while maintaining proper supply air conditions at various ambient and load conditions.

The switching device 1613 is connected to a suction accumulator 1636 via branch 1658. The suction accumulator 1636 may include a heater 1637 that may be energized and controlled by the control module 1670 to prevent liquid refrigerant from entering the compressor 1601. The fluid path continues along refrigerant branch 1659. The refrigerant branch 1659 extends to and from the suction accumulator 1636 and the compressor 1601. Various temperature and pressure sensors are located along branch 1659 to ensure proper refrigerant system 1600 operation and provide the control module 1670 with various sensed conditions.

The control module 1670 may control the flow of refrigerant to the heat exchanger 1608 by controlling the opening of the valves 1606 and 1607 to optimize dehumidification and reheating control in the summer, or may be utilized to improve heating efficiency and coefficient of performance in the winter heating mode by increasing the effective surface area of the heat sinks available in the refrigeration system 1600. In at least one embodiment, the control module 1670 controls the flow of refrigerant to the heat exchanger 1611 by controlling the opening of the valve 1610 to optimize energy efficiency ratio in the summer mode by increasing the effective surface area of the heat sinks available in the refrigeration system 1600.

Figure 17:
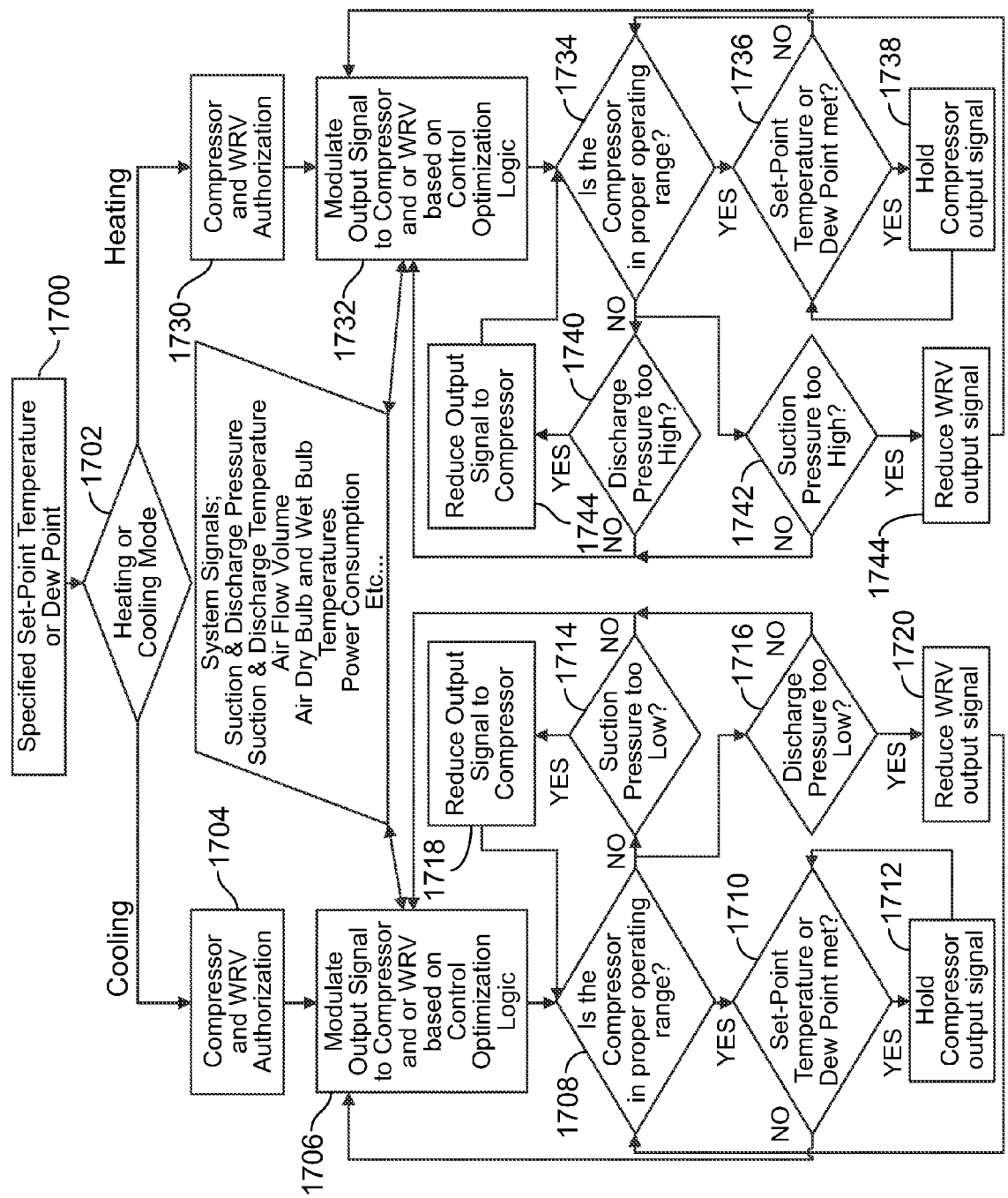
FIG. 17 illustrates a flow chart of control logic of a water source heat pump system, according to an embodiment of the present disclosure.

FIG. 17 illustrates a flow chart of control logic of a water source heat pump system, according to an embodiment of the present disclosure. The control logic may be performed by a control module, such as a computing device, for example. The water source heat pump system may utilize a variable capacity compressor and a water control valve to regulate water flow to a water-refrigerant heat exchanger. At 1700, a set-point temperature and/or dew point is selected and specified. At 1702, it is determined whether the system is in a heating or cooling mode. If in a cooling mode, at 1704, a compressor and water-regulating valve (WRV) are operational and authorized for use. For example, a control module may determine if the compressor and WRV are available for use. Then, at 1706, an output signal to the compressor and/or WRV may be modulated based on control optimization logic. For example, the output signal may be modulated based on suction and discharge pressure, suction and discharge temperature, air flow volume, air dry bulb and wet bulb temperatures, power consumption, water flow volume, water temperature, and/or the like.

At 1708, it is determined whether the compressor is operating within a proper operating range. If so, the process continue to 1710, where it is determined if the specified set-point temperature and/or dew point is met. If so, the process continues to 1712, in which the compressor output signal is maintained. The process then returns to 1710.

If, however, at 1708, the compressor is outside of a proper operating range, the process continues to 1714, in which it is determined whether the suction pressure is too low, and 1716, in which it is determined if the discharge pressure is too low. If the suction pressure is too low, the process continues to 1718, in which the output signal to the compressor is reduced. If, however, the suction pressure is not too low, the process returns to 1706.

If, at 1716, the discharge pressure is too low, the process continues to 1720, in which the WRV output signal is reduced. If, however, the discharge pressure is not too low, the process returns to 1706.

Returning again to 1702, if in the heating mode, the process continues to 1730, in which the compressor and WRV are authorized for use. At 1732, the output signal to the compressor and/or WRV is modulated based on control optimization logic, as described above. The process then continues to 1734 in which it is determined whether the compressor is operating within a proper range. If so, the process continues to 1736, in which it is determined whether the set-point temperature and/or dew point is met. If so, the process continues to 1738, in which the compressor output signal is maintained. The process then returns to 1736. If the set point temperature and/or dew point is not met at 1736, the process returns to 1732.

Returning to 1734, if the compressor is not operating in the proper operating range, the process moves to 1740, in which it is determined if the discharge pressure is too high, and 1742, in which it is determined whether the suction pressure is too high. If the discharge pressure is too high at 1740, the process continues to 1744, in which an output signal to the compressor is reduced, and the process returns to 1734. If, however, the discharge pressure is not too high at 1740, the process returns to 1732.

If, at 1742, the suction pressure is too high, the process continues to 1746, in which the WRV output signal is reduced, and the process returns to 1734. If, however, the suction pressure is not too high, the process returns to 1732.

Figure 18:
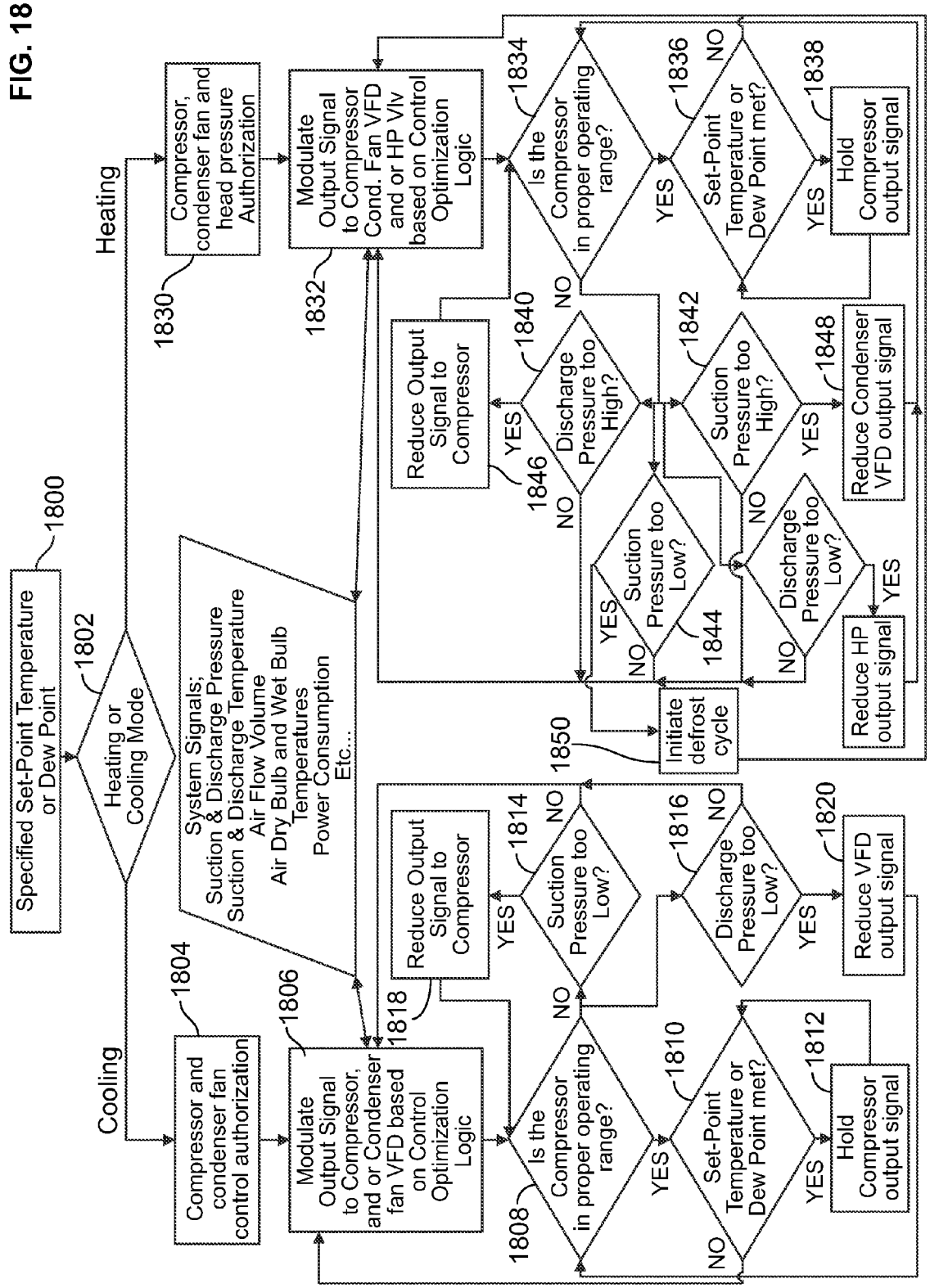
FIG. 18 illustrates a flow chart of control logic of an air source heat pump system, according to an embodiment of the present disclosure.

FIG. 18 illustrates a flow chart of control logic of an air source heat pump system, according to an embodiment of the present disclosure. The control logic may be performed by a control module, such as a computing device, for example. The heat pump system may utilize a variable capacity compressor, a variable speed air fan to regulate air flow to an air-refrigerant heat exchanger, and a refrigerant head pressure control valve to regulate the saturated condenser temperature. At 1800, a set-point temperature and/or dew point is selected and specified. At 1802, it is determined whether the system is in a heating or cooling mode. If in a cooling mode, at 1804, a compressor and condenser fan control are available and authorized for use. For example, a control module may determine if the compressor and condenser fan control are available for use. Then, at 1806, an output signal to the compressor and/or condenser fan variable frequency drive (VFD) may be modulated based on control optimization logic. For example, the output signal may be modulated based on suction and discharge pressure, suction and discharge temperature, air flow volume, air dry bulb and wet bulb temperatures, power consumption, and/or the like.

At 1808, it is determined whether the compressor is operating within a proper operating range. If so, the process continue to 1810, in which it is determined if the specified set-point temperature and/or dew point is met. If so, the process continues to 1812, in which the compressor output signal is maintained. The process then returns to 1810.

If, however, at 1808, the compressor is outside of a proper operating range, the process continues to 1814, in which it is determined whether the suction pressure is too low. If the suction pressure is too low, the process continues to 1818, in which the output signal to the compressor is reduced. If, however, the suction pressure is not too low, the process returns to 1806.

If, at 1816, the discharge pressure is too low, the process continues to 1820, in which the VFD output signal is reduced. If, however, the discharge pressure is not too low, the process returns to 1806.

Returning again to 1802, if in the heating mode, the process continues to 1830, in which the compressor, condenser fan, and head pressure control are authorized for use. At 1832, the output signal to the compressor, condenser fan VFD, and/or head pressure valve is modulated based on control optimization logic, as described above. The process then continues to 1834, in which it is determined whether the compressor is operating within a proper range. If so, the process continues to 1836, in which it is determined whether the set-point temperature and/or dew point is met. If so, the process continues to 1838, in which the compressor output signal is maintained. The process then returns to 1836. If the set point temperature and/or dew point is not met at 1836, the process returns to 1832.

Returning to 1834, if the compressor is not operating in the proper operating range, the process moves to 1840, in which it is determined if the discharge pressure is too high, 1842, in which it is determined whether the suction pressure is too high, and 1844, in which it is determined whether the suction pressure is too low. If the discharge pressure is too high at 1840, the process continues to 1846, in which an output signal to the compressor is reduced, and the process returns to 1834. If, however, the discharge pressure is not too high at 1840, the process returns to 1832.

If, at 1842, the suction pressure is too high, the process continues to 1848, in which the condenser VFD output signal is reduced, and the process returns to 1834. If, however, the suction pressure is not too high, the process returns to 1832.

If, at 1844, the suction pressure is too low, a defrost cycle is initiated at 1850. The process then returns to 1832. If, however, the suction pressure is not too low, the process returns to 1832.

Figure 19:
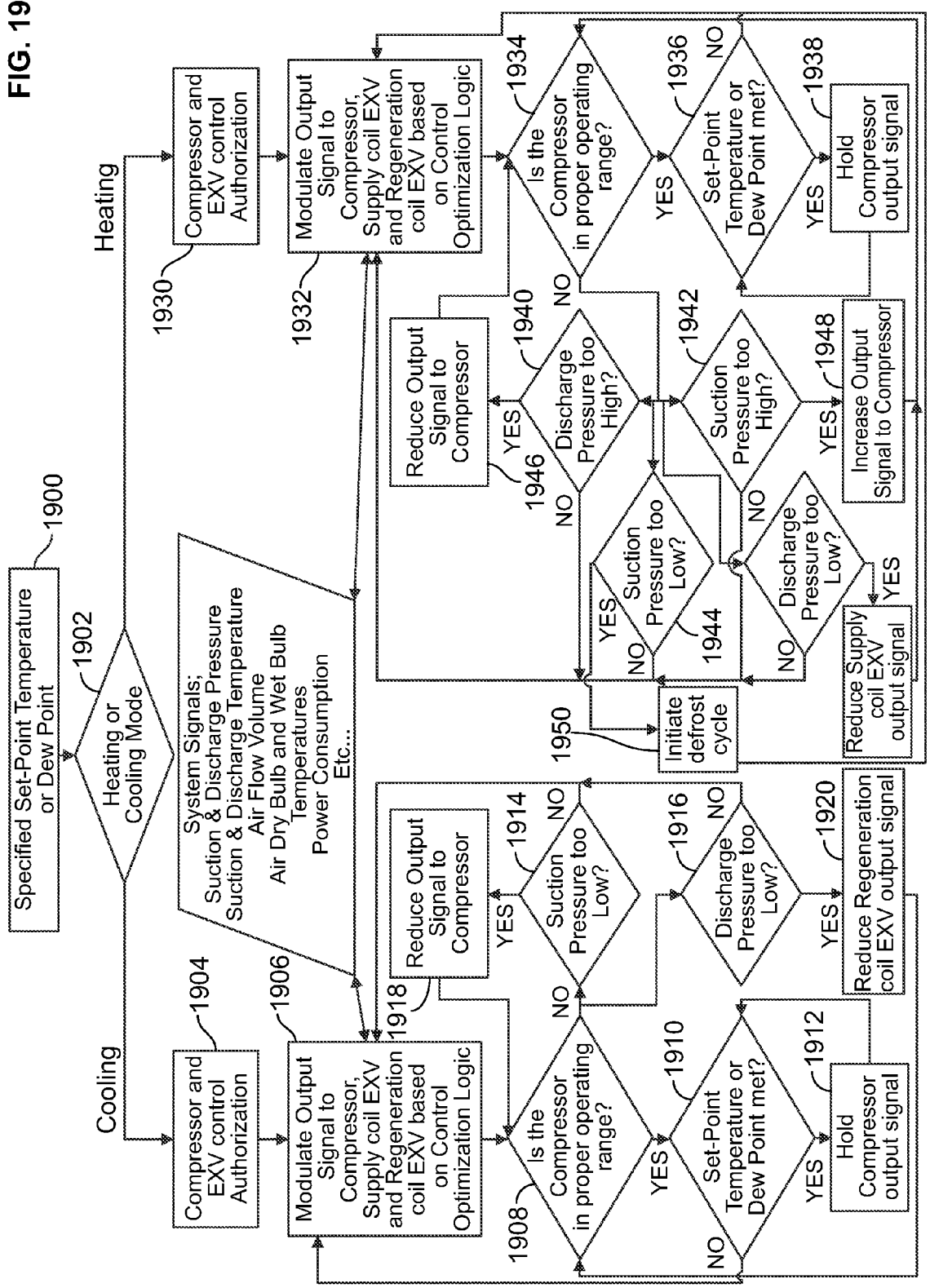
FIG. 19 illustrates a flow chart of control logic of an air source heat pump system, according to an embodiment of the present disclosure.

FIG. 19 illustrates a flow chart of control logic of an air source heat pump system, according to an embodiment of the present disclosure. The control logic may be performed by a control module, such as a computing device, for example. The heat pump system may include a variable capacity compressor, and an electronic metering device configured to regulate the flow of refrigerant in a heat source coil and control the amount of liquid refrigerant in a heat sink coil to ensure optimum heating efficiency, coefficient of performance and energy efficiency ratio while maintaining proper supply air conditions at various ambient and load conditions. At 1900, a set-point temperature and/or dew point is selected and specified. At 1902, it is determined whether the system is in a heating or cooling mode. If in a cooling mode, at 1804, a compressor and electronic expansion valve (EXV) are authorized for use. For example, a control module may determine if the compressor and condenser fan control are available for use. Then, at 1906, an output signal to the compressor, supply coil EXV, and/or regeneration coil EXV may be modulated based on control optimization logic. For example, the output signal may be modulated based on suction and discharge pressure, suction and discharge temperature, air flow volume, air dry bulb and wet bulb temperatures, power consumption, and/or the like.

At 1908, it is determined whether the compressor is operating within a proper operating range. If so, the process continue to 1910, in which it is determined if the specified set-point temperature and/or dew point is met. If so, the process continues to 1912, in which the compressor output signal is maintained. The process then returns to 1910.

If, however, at 1908, the compressor is outside of a proper operating range, the process continues to 1914, in which it is determined whether the suction pressure is too low. If the suction pressure is too low, the process continues to 1918, in which the output signal to the compressor is reduced. If, however, the suction pressure is not too low, the process returns to 1906.

If, at 1916, the discharge pressure is too low, the process continues to 1920, in which the regeneration coil EXV output signal is reduced. If, however, the discharge pressure is not too low, the process returns to 1906.

Returning again to 1902, if in the heating mode, the process continues to 1830, in which the compressor and EXV control are authorized for use. At 1932, the output signal to the compressor, supply coil EXV, and/or regeneration coil EXV is modulated based on control optimization logic, as described above. The process then continues to 1934, in which it is determined whether the compressor is operating within a proper range. If so, the process continues to 1936, in which it is determined whether the set-point temperature and/or dew point is met. If so, the process continues to 1938, in which the compressor output signal is maintained. The process then returns to 1936. If the set point temperature and/or dew point is not met at 1936, the process returns to 1932.

Returning to 1934, if the compressor is not operating in the proper operating range, the process moves to 1940, in which it is determined if the discharge pressure is too high, 1942, in which it is determined whether the suction pressure is too high, and 1944, in which it is determined whether the suction pressure is too low. If the discharge pressure is too high at 1940, the process continues to 1946, in which an output signal to the compressor is reduced, and the process returns to 1934. If, however, the discharge pressure is not too high at 1940, the process returns to 1832.

If, at 1942, the suction pressure is too high, the process continues to 1948, in which the output signal to the compressor is increased, and the process returns to 1934. If, however, the suction pressure is not too high, the process returns to 1832.

If, at 1944, the suction pressure is too low, a defrost cycle is initiated at 1950. The process then returns to 1932. If, however, the suction pressure is not too low, the process returns to 1932.

Referring to FIGS. 17-19, a control module, such as any of those described above, is configured to sense one or more conditions of the refrigeration circuit, such as suction pressure, discharge pressure, refrigerant temperature, and/or the like, and control the output of the compressor in response to the sensed condition. For example, during use of an Air Source Heat Pump (ASHP) or Water Source Heat Pump (WSHP), the heat gain or temperature rise across a supply heat exchanger or heat sink depends on the compressor heat of rejection. In a refrigeration cycle, the evaporator heat exchanger or heat source (air source or water source as examples) adds energy to the refrigerant through the evaporating process. Vaporized refrigerant is compressed by the compressor at high temperature and high pressure. During the compression process, compressor heat is added to the refrigerant. The condenser condenses the refrigerant back into the liquid phase. The condenser energy equals evaporation energy plus compressor heat gain. The greater the evaporator and larger the compressor, the greater the heat of rejection in the condenser. The total heat of rejection from the condenser coil is the summation of the individual compressor circuits. Typically, compressors are of fixed capacity as they are the most economical solution. So when the compressor is operating, all the heat of rejection is dissipated in the air or water (into the heat sink media).

Air distribution systems can be broken down into two primary systems: 1) Constant Air Volume Systems (CAV), and 2) Variable Air Volume Systems (VAV). Heat Pumps were traditionally utilized in CAV systems. However, heat pumps are also used in VAV systems. VAV systems add complexity when compressor heat is utilized. Temperature rise across the condenser coil depends on the amount of heat to be dissipated from the refrigerant as previously described above, but also dependent on the heat sink properties, primarily the entering air temperature and the volume of air flow.

As an example, assuming a heat pump system with two compressors (one fixed stage and one modulating), each compressor would provide 20° F. temperature rise across the condenser/supply heat exchanger at 100% of the supply air flow; thus a total of 40° F. Assuming 100% of the air flow across the supply heat exchanger and the entering air temperature (EAT) is 70° F. with one compressor operating, the leaving air temperature (LAT) would be 90° F. Should the air flow across the supply heat exchanger be reduced to 50%, the temperature rise with only one compressor would be 40° F., EAT=70° F. and the LAT will be 110° F. A given refrigerant in a refrigeration system operating at a given condition will result in a specific saturated condensing temperature (SCT) and a specific saturated suction temperature (SST). Both SCT and SST result in a corresponding pressure in the refrigeration system. Compressor ratio is the ratio of the SCT to the SST. Compressors operate within a limited and defined operating envelope or range, otherwise compressor damage and failure would result. For air conditioning applications and typical industry HVAC refrigeration systems, coil and compressor sizing yields a corresponding maximum SCT of approximately 130° F. In a heat pump system (water source or air source) a 130° F. SCT results in a discharge air temperature off the heat sink coil of approximately 120° F. Operating the heat pump equipment beyond 130° F. SCT typically results in a head pressure safety trip and locks the compressor, thereby requiring human intervention to reset the switch, thus resulting in a heating interruption.

With a 20° F. temperature rise per compressor in a VAV system with 40% of the total air flow and an EAT of 70° F., a discharge temperature of approximately 120° F. is produced. (20 F/0.4+70 F). Typical VAV system air flow varies between 25% and 100% of the design air flow. In this example, the air flow may not be reduced below 40% of the design air flow without resulting in a high pressure trip. To provide heating at all the possible air flow (from 25 to 100%), adequate modulation or sufficient compressor staging may be utilized.

Typical water source heat pumps (WSHP) are sized for either 100% outside air or mixed air systems. In a mixed air system, return air or a mixture of return air and outside air is heated to satisfy building heating requirements. In this case, equipment designers size the various components (for example, compressor and coils) to match the specific duty (100% outside air or mixed air). In mixed air applications the design temperature rise is usually around 20° F. (raise air temperature from 65° F. to 85° F.), and in a 100% outside air application, the temperature rise is usually around 50° F. (raise temperature from 35° F. to 85° F.). When a 100% outside air application (sized with a 50° F. temperature rise) is used for mixed air application, in which the entering air temperature is 65° F., a 50° F. degree rise yields 115° F. discharge temperature (65° F.+50° F.), which may be close to a maximum temperature possible from a typical refrigeration system. In this case, air flow in a VAV system may not be reduced lower than 95% of the total air flow (115/0.95), which may not represent significant modulation for a typical VAV system that could normally operate to 25% of the design air flow.

Geothermal water loops may be utilized in WSHPs because the ground provides a heat source in the winter and heat sink in the summer for the refrigeration system. Designers typically size the system for peak design—worst case conditions, for example. In the summer, the system may be configured for the warmest water temperature and in the winter for the coldest water temperature. As a result, a heat exchanger surface area may be sized and selected for peak conditions. In geothermal water loop designs and the associated ground thermal conductivity, on the first day in spring requiring cooling, the water loop temperature is near the winter water design conditions or at their coldest; and on the first day in fall requiring heating, the water loop temperature is near the summer water design conditions or at their warmest. In both these cases the heat exchanger surface area of both the heat source and heat sink are effectively oversized. In both the first cooling day and first heating day, water flow to the water-to-refrigerant heat exchanger may be reduced, otherwise the compressor may operate outside the operation envelope or range.

In both WSHP and ASHP systems, operating at very low ambient conditions while maintaining sufficient saturated condensing temperatures (SCT) may prove difficult. Reducing the effective size of the heat sink or heat exchanger can effectively increase SCT. Fluctuations in heat source and heat sink conditions through the year, such as entering water, entering air temperatures, as well as water flow and air flow rates, may impact system performances.

According to at least one embodiment of the present disclosure, a control optimization strategy monitors various inputs such as air, water conditions, as well as refrigerant conditions and responds as follows: Decreased saturated condensing temperature (SCT): the control system either decreases compressor capacity, decreases output signal to compressor, reduces entering air or water temperature and/or increases air flow or water flow across or inside the heat sink; Increased SCT: the control system either reduces effective heat sink capacity, floods heat sink with refrigerant, increases entering air or water temperature and/or decreases air flow or water flow across or inside the heat sink; Decreased saturated suction temperature (SST): the control system either reduces effective heat source capacity, floods heat source with refrigerant, decreases entering air or water temperature, and/or decreases air flow or water flow across or inside the heat source; Increased SST: the control system either decreases compressor capacity, decreases output signal to compressor, increases entering air or water temperature, and/or increases air flow or water flow across or inside the heat source; and increases effective heat source capacity and/or removes ice build-up on heat source.

As an example, an electronic expansion valve (EXV) may act on the refrigeration system in at least two distinctive ways: 1) as a traditional expansion device to change the refrigerant from a high pressure liquid to a low pressure liquid, or 2) to flood the heat exchanger with refrigerant and reduce the effective heat exchanger capacity in both the summer and winter mode of operation to increase SCT.

Referring again to FIGS. 1-19, the control modules, units, devices, and the like may form, or be part of, circuitry, a computer, and/or the like, that is configured to control operation of the systems and methods described herein. As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the module(s) may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A heat pump system configured to provide conditioned air to an enclosed space, the heat pump system comprising:
   a supply air channel configured to receive air and discharge supply air into the enclosed space;
   a regeneration air channel configured to receive regeneration air from the enclosed space and discharge exhaust air;
   a regeneration air heat exchanger positioned in the regeneration air channel, wherein the regeneration air heat exchanger is configured to remove heat from the regeneration air during a heating cycle, wherein the regeneration air heat exchanger is configured to operate in a normal mode and a defrost mode; and
   at least one damper positioned proximate to the regeneration air heat exchanger, wherein the at least one damper includes a plurality of actuatable portions, wherein each of the plurality of actuatable portions is configured to independently operate, and wherein the at least one damper is configured to sequentially open and close each of the plurality of actuatable portions during the defrost mode.

2. The heat pump system of claim 1, further comprising a refrigeration circuit operatively connected to the regeneration air heat exchanger, wherein hot refrigerant is used to directly and sequentially defrost the regeneration air heat exchanger.

3. The heat pump system of claim 2, wherein the refrigeration circuit comprises a compressor, and wherein the compressor is configured to be overdriven during the defrost mode.

4. The heat pump system of claim 2, further comprising a control module configured to control one or more of (a) movement of the hot refrigerant through the refrigeration circuit and (b) the at least one damper in order to reduce frost formation on the energy recovery module or the regeneration air heat exchanger.

5. The heat pump system of claim 2, further comprising an energy recovery module that extends between the supply air channel and the regeneration air channel, wherein the energy recovery module is configured to remove heat and moisture from the regeneration air during the normal mode.

6. The heat pump system of claim 3, further comprising a control module configured to sense at least one condition of the refrigeration circuit and control the output of the compressor in response to the sensed condition.

7. The heat pump system of claim 5, further comprising a control module configured to control operation of the energy recovery module.

8. The heat pump system of claim 5, further comprising a heating coil in at least one of the supply air channel or regeneration air channel.

9. The heat pump system of claim 1, wherein the regeneration air heat exchanger is angled within the regeneration air channel, wherein the angle of the regeneration air channel is configured to allow water to shed to an upstream side of the heat exchanger during the defrost mode.

10. The heat pump system of claim 1, wherein the regeneration air heat exchanger comprises a plurality of coil sub-sections, wherein each of the plurality of coil sub-sections is separately and sequentially defrosted.

11. The heat pump system of claim 1, wherein the normal mode and the defrost mode occur simultaneously.

12. A method of providing conditioned air to an enclosed space, the method comprising:
    positioning a regeneration air heat exchanger in a regeneration air channel of a heat pump;
    using the regeneration air heat exchanger to remove heat from regeneration air within the regeneration air channel during a heating cycle;
    independently operating each of a plurality of actuatable portions of at least one damper positioned proximate to the regeneration air heat exchanger; and
    sequentially opening and closing each of the plurality of actuatable portions during a defrost mode.

13. The method of claim 12, further comprising:
    operatively connecting a refrigeration circuit to the regeneration air heat exchanger; and
    directly and sequentially defrosting the regeneration air heat exchanger with hot refrigerant that is circulated within the refrigeration circuit.

14. The method of claim 13, further comprising overdriving a compressor during the defrost mode.

15. The method of claim 14, further comprising:
    sensing at least one condition of a refrigeration circuit with a control module, and using the control module to control the output of the compressor in response to the sensed condition.

16. The method of claim 12, wherein the positioning comprises angling the regeneration air heat exchanger within the regeneration air channel, wherein the angle of the regeneration air channel is configured to allow water to shed to an upstream side of the heat exchanger during the defrost mode.

17. The method of claim 12, wherein the heating cycle and the defrost mode occur simultaneously.

* * * * *